(12) United States Patent
Owen

(10) Patent No.: US 8,810,349 B2
(45) Date of Patent: Aug. 19, 2014

(54) POWER INPUT DEVICE WITH CURRENT PULSE MULTIPLIER TRANSFORMER TO REDUCE HARMONIC CURRENTS IN CONVERTER/INVERTER CIRCUITS AND DEVICES, AND METHOD OF MAKING THE SAME

(75) Inventor: Donald W. Owen, Plano, TX (US)

(73) Assignee: Howard Industries, Inc., Laurel, MS (US)

( * ) Notice: Subject to any disclaimer, the term of this patent is extended or adjusted under 35 U.S.C. 154(b) by 785 days.

(21) Appl. No.: 13/018,937

(22) Filed: Feb. 1, 2011

(65) Prior Publication Data

US 2011/0187484 A1    Aug. 4, 2011

Related U.S. Application Data

(60) Provisional application No. 61/300,238, filed on Feb. 1, 2010.

(51) Int. Cl.
*H01F 30/12*     (2006.01)

(52) U.S. Cl.
USPC .............................................. 336/5; 336/12

(58) Field of Classification Search
CPC ....................................................... H01F 30/12
USPC ......................................................... 336/5, 12
See application file for complete search history.

(56) References Cited

U.S. PATENT DOCUMENTS

| | | | | |
|---|---|---|---|---|
| 4,513,243 A | * | 4/1985 | Novak et al. | 323/361 |
| 4,853,664 A | * | 8/1989 | Asakura | 336/12 |
| 5,625,545 A | * | 4/1997 | Hammond | 363/71 |
| 6,052,293 A | * | 4/2000 | Ivner et al. | 363/36 |
| 6,249,443 B1 | * | 6/2001 | Zhou et al. | 363/5 |
| 7,161,456 B2 | * | 1/2007 | Knox | 336/90 |
| 2008/0165553 A1 | * | 7/2008 | Swamy | 363/67 |

* cited by examiner

*Primary Examiner* — Elvin G Enad
*Assistant Examiner* — Ronald Hinson

(57) ABSTRACT

A power supply device comprising an advanced harmonic current quashing (AHQ) and current pulse multiplier (CPM) (AHQ/CPM) three-phase transformer having: a primary winding placed around a magnetic core and having three primary winding input leads to connect a three phase power supply; and a plurality of secondary windings placed around the magnetic core in a predetermined winding turns configuration to generate a plurality of three phase outputs, where each three phase output of the plurality of three phase outputs has a different phase angle from all other three phase outputs, with each unique phase angle associated with a three phase output of a corresponding secondary winding being determined based on the winding turns configuration utilized for the corresponding secondary winding. A variable frequency drive (VFD) having 3N converters/inverters coupled to the secondary windings outputs exhibit substantially reduced harmonic currents and a current pulse number of greater than 6N.

23 Claims, 22 Drawing Sheets

POWER INPUT DEVICE WITH CURRENT PULSE MULTIPLIER TRANSFORMER TO REDUCE HARMONIC CURRENTS IN CONVERTER/INVERTER CIRCUITS AND DEVICES, AND METHOD OF MAKING THE SAME

PRIORITY CLAIM

This application claims priority from U.S. Provisional Patent Application, Ser. No. 61/300,238, filed on Feb. 1, 2010.

BACKGROUND OF THE INVENTION

1. Technical Field

The present invention relates generally to electrical circuits and in particular to transformer circuits. Still more particularly, the present invention relates to transformer circuits and designs that reduce harmonic currents in three phase applications.

2. Description of the Related Art

When powering certain types of electrical devices and/or circuits, such as a variable frequency drive (VFD) utilized to supply power to nonlinear loads, such as large pumping systems in the offshore petroleum industry, the occurrence of harmonic currents associated with the alternating current (AC) power source presents an undesirable effect in the operations of the device/circuit. The amount of harmonic currents present in a conventional VFD system (depicted in FIG. 1) is typically directly correlated to the pulse number (number of current pulses) associated with the power input to the converter sections of the VFD. In turn, with conventional VFD designs, the pulse number is equal to two times (2×) the number of converter/inverter modules within the overall drive system. This 2× pulse characteristic results from the fact that each series connected device in each of the three output legs has a corresponding device in each of the other two legs where the current pulses occur simultaneously. Additionally, the VFD systems themselves often present a nonlinear load to the AC power source, and thus manifest/exhibit a high incidence of harmonic currents in the power system.

SUMMARY

Disclosed are a plurality of three phase power input devices and variable frequency drive (VFD) systems, which include a three phase transformer circuit that is designed with an output winding phase angle scheme that yields advanced harmonic current quashing (AHQ) within the power input device and/or the VFD system based on an increase in the number of current pulses (pulse number) in the power input to components of the VFD. The transformer circuits comprise a secondary winding scheme that provides a plurality of secondary winding output leads to power each of multiple converter/inverter components of the connected VFD. Each of the three phase transformer outputs coupled to a respective converter/inverter has a unique/different phase angle from the phase angle of each one of the other three phase transformer outputs that are applied to the other converter/inverter components of the VFD. The resulting power input device and/or VFD system exhibits a substantial increase in the pulse number, with a magnitude of greater than two times (2×) (and up to six times (6×)) the number of converter/inverter modules in the VFD. With this significant increase in the pulse number, the power input device and/or VFD system also exhibits a corresponding substantial decrease in the harmonic currents associated with the power inputs to the VFD and the VFD system.

A first embodiment provides a power input device comprising: an advanced harmonic current quashing (AHQ) or current pulse multiplier (CPM) three-phase transformer having: a magnetic core having a three phase configuration; a primary winding placed around the magnetic core and having three primary winding leads to which a three phase power supply can be connected; and a plurality of secondary windings placed around the magnetic core in a predetermined winding turns configuration to generate a plurality of three phase outputs, where each three phase output of the plurality of three phase outputs has a different phase angle from all other three phase outputs, with each unique phase angle associated with a three phase output of a corresponding secondary winding being determined based on the winding turns configuration utilized for the corresponding secondary winding. The power input device further comprises an arrangement of three-phase to single-phase electrical components, with a three phase input of each electrical component coupled to one of the three phase outputs, wherein the arrangement is comprised of three legs of N series-connected electrical devices, where the N electrical devices exhibit similar output voltage characteristics and a terminal endpoint of each of the three legs provides one phase of a final three phase output of the power input device.

The predetermined winding turns configuration comprises a whole number of turns for each secondary winding, with each whole number selected via engineering design to produce a specific output phase angle for each secondary winding output that is unique relative to the other output phase angles and which enables a connected device having components coupled to each of the secondary winding outputs to exhibit reduced harmonic currents and a higher than 2× current pulse relative to a number of the secondary winding outputs. Also, responsive to a three phase power being applied across the primary winding inputs, each secondary winding output provides an output voltage having a voltage deviation that is within a pre-designated acceptable range relative to a desired voltage for powering the connected device. In the embodiments described, each secondary winding is arranged in a phase shifting configuration to yield the different phase angles of the secondary windings outputs.

According to one implementation, the AHQ/CPM transformer comprises: an external casing surrounding the primary winding and plurality of secondary windings wound around the magnetic core; and three input terminals at which the three primary winding leads terminate. The AHQ/CPM transformer also comprises: a plurality of output terminals at which the ends of the secondary windings terminate and at which input leads of the arrangement of electrical components being powered via the three phase outputs of the secondary windings can be connected. In the described embodiments, the plurality of three phase outputs are arranged in three sets of N secondary windings outputs, with each output within each of the sets of N secondary windings output exhibiting a different phase angle relative to the other outputs in a same set. Also, the arrangement of electrical components comprises a plurality of three-phase to single-phase converters/inverters arranged in a three legged configuration of N series-connected converters/inverters with each leg connected at a midpoint neutral, wherein a three phase input of each converter/inverter of the plurality of converters/inverters is coupled to one of the three phase outputs and the three legged configuration of N series-connected converters/inverters provides a three phase output comprised of the sum of each single-phase output for each converter/inverter on each leg of the three legged configuration.

Additionally, in one implementation, the magnetic core is a three legged magnetic core and each set of N secondary windings is wound around a respective one of the three legs of the magnetic core. Alternate implementations provide for other types of three-phase configuration of the magnetic core.

According to the described embodiments, the variable N is an integer number that is selected based on a power input configuration of a device that is to be powered by the AHQ/CPM transformer. In one or more embodiments, N equals an integer number from among one, two, three and four and the resulting transformer yields current pulse characteristics of an 18 pulse, a 36 pulse, a 54 pulse and a 72 pulse device.

A second embodiment provides a system comprising: an electrical device having three legs connected at an electrical neutral, with each leg extending from the electrical neutral to provide one of three outputs, wherein each leg comprises N serially-connected components that each comprises a three phase input and a single phase output; and an AHQ/CPM transformer comprising: a plurality of secondary windings placed around the magnetic core in a predetermined winding turns configuration to generate three sets of N three phase outputs that are respectively coupled to the N serially-connected components of each leg of the electrical device, where each three phase output of the plurality of three phase outputs has a different phase angle from all other three phase outputs. Each unique phase angle associated with a three phase output of a corresponding secondary winding is determined based on the winding turns configuration utilized for the corresponding secondary winding. The 3N serially-connected components exhibit similar output voltage characteristics based on the input voltage applied. The secondary windings outputs with unique phase angles provided for each output powers the serially-connected converters/inverters of the VFD to yield electrical characteristics within the VFS system including: (a) a number of current pulses (current pulse number) that is greater than a total number of the N serially-connected devices (6N) multiplied by two (2); and (b) a substantial reduction in harmonic currents within the VFD system based on the increase in current pulse number, such that the VFD system exhibits and yields minimal harmonic currents.

According to one embodiment, the electrical device is a variable frequency drive (VFD), each of the electrical components is a converter/inverter, and the system is a VFD system. Each converter/inverter of the VFD provides a single phase output voltage when power is applied across the three phase input from a connected secondary windings output of the AHQ/CPM transformer. In the described embodiments, a first group of N secondary windings output of the AHQ/CPM transformer are coupled to the three phase inputs of the N serially-connected converters/inverters of a first leg of the VFD, a second group of N secondary windings output of the AHQ/CPM transformer are coupled to the three phase inputs of the N serially-connected converters/inverters of a second leg of the VFD, and a third group of N secondary windings output of the AHQ/CPM transformer are coupled to the three phase inputs of the N serially-connected converters/inverters of a third leg of the VFD.

According to one aspect of the described embodiments, the predetermined winding turns configuration of the AHQ/TPM transformer comprises a whole number of turns for each secondary winding, with each whole number selected via engineering design to produce a specific output phase angle for each secondary winding output that is unique relative to the other output phase angles and which enables a connected device having components coupled to each of the secondary winding outputs to exhibit reduced harmonic currents and a higher than two times (2x) current pulses relative to a number of the secondary windings outputs. Also, because of the whole number turns utilized for the secondary windings, responsive to a three phase power being applied across the primary winding inputs of the AHQ/CPM transformer, each secondary windings output provides an output voltage having a voltage deviation that is within a pre-designated acceptable range relative to a desired voltage for powering the connected electrical device.

In the described embodiments, N is an integer number, and in four specific implementations, N equals an integer number from among one, two, three and four, and the corresponding VFD system exhibits current pulse characteristics of an 18 pulse, a 36 pulse, a 54 pulse and a 72 pulse VFD system.

In one implementation the system comprises: an external casing surrounding the AHQ/CPM transformer and connected VFD; three input terminals at which the three primary winding leads of the AHQ/CPM transformer terminate; and three VFD output terminals at which the ends of each of the three legs of the VFD terminate and at which an external device requiring three phase input can be connected.

A third embodiment provides a method for engineering and manufacturing a power input device, such as a VFD system, having an AHQ/CPM transformer. The method comprises: determining one or more desired characteristics to be exhibited by a resulting transformer and/or the resulting power input device, including a voltage output range and a number of secondary windings outputs; placing a primary winding around a magnetic core having a three-phase configuration, where the primary winding has input leads at which a three phase power supply can be connected; placing a plurality of secondary windings around the limbs of the magnetic core, where the secondary windings are radially spaced from the primary winding, and the secondary windings provide three output winding groups of N secondary windings output; and coupling a system of electrical components to the output winding groups, said system comprising three legs of N serially-connected electrical devices each having a three phase input and a single phase output, where the N electrical devices exhibit similar output voltage characteristics. The number of turns provided for each of the secondary windings is determined based on one or more desired characteristics and a configuration that enables each secondary winding output to exhibit a different phase angle from every other secondary winding output of the AHQ/CPM transformer. Also, a winding turns configuration of the AHQ/TPM transformer comprises a whole number of turns for each secondary winding, with each whole number selected via engineering design based on the desired characteristics to produce a specific unique output phase angle for each secondary winding output that is different relative to each other output phase angle and which enables a power input to each of the converters/inverters from the secondary winding outputs to exhibit substantially reduced harmonic currents and higher than two times (2x) current pulses relative to a number of the secondary windings outputs.

In one embodiment, coupling the system of electrical components to the output winding groups further comprises coupling to each of the three phase outputs a three phase input of a three-phase to single phase converter/inverter arranged in a three-legged configuration of N series-connected converters/inverters with each leg connected at a midpoint neutral, which configuration provides a three-phase output comprised of each of three sums of single-phase output for each converter/inverter connected on a same leg of the three legged configuration.

The above as well as additional features and advantages of the present invention will become apparent in the following detailed written description.

BRIEF DESCRIPTION OF DRAWINGS

The novel features believed characteristic of the illustrative embodiments will be set forth in the claims. The embodiments, however, will best be understood by reference to the following detailed description of illustrative embodiments when read in conjunction with the accompanying drawings, wherein:

DETAILED DESCRIPTION OF ILLUSTRATIVE EMBODIMENTS

Figure 1:
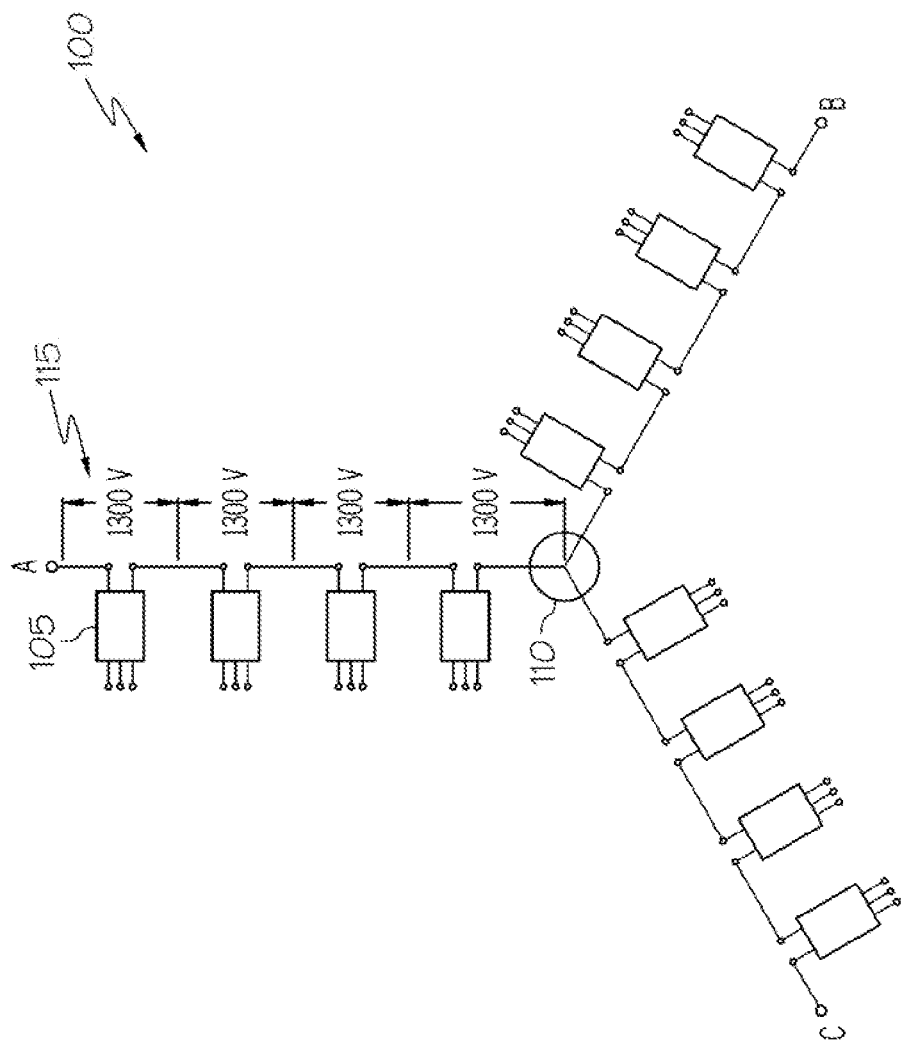
FIG. 1 is a schematic diagram illustrating the topology of an example variable frequency drive (VFD) with three output legs each having multiple three-phase to single-phase converters/inverters, according to the prior art.

Embodiments described herein provide a plurality of three phase power input devices and variable frequency drive (VFD) systems, which include a three phase transformer circuit that is designed with an output winding phase angle scheme that yields advanced harmonic current quashing (AHQ) within the power input device and/or the VFD system based on an increase in the number of current pulses (pulse number) in the power input to components of the VFD. The transformer circuits comprise a secondary winding scheme that provides a plurality of secondary winding output leads to power each of multiple converter/inverter components of the connected VFD. Each of the three phase transformer outputs coupled to a respective converter/inverter has a unique/different phase angle from the phase angle of each one of the other three phase transformer outputs that are applied to the other converter/inverter components of the VFD. The resulting power input device and/or VFD system exhibits a substantial increase in the pulse number, with a magnitude of greater than two times (2x) (and up to six times (6x)) the number of converter/inverter modules in the VFD. With this significant increase in the pulse number, the power input device and/or VFD system also exhibits a corresponding substantial decrease in the harmonic currents associated with the power inputs to the VFD and the VFD system.

A first embodiment provides a power input device comprising: an advanced harmonic current quashing (AHQ) or current pulse multiplier (CPM) three-phase transformer having: a magnetic core having a three phase configuration; a primary winding placed around the magnetic core and having three primary winding leads to which a three phase power supply can be connected; and a plurality of secondary windings placed around the magnetic core in a predetermined winding turns configuration to generate a plurality of three phase outputs, where each three phase output of the plurality of three phase outputs has a different phase angle from all other three phase outputs, with each unique phase angle associated with a three phase output of a corresponding secondary winding being determined based on the winding turns configuration utilized for the corresponding secondary winding. The power input device further comprises an arrangement of three-phase to single-phase electrical components, with a three phase input of each electrical component coupled to one of the three phase outputs, wherein the arrangement is comprised of three legs of N series-connected electrical devices, where the N electrical devices exhibit similar output voltage characteristics and a terminal endpoint of each of the three legs provides one phase of a final three phase output of the power input device.

The predetermined winding turns configuration comprises a whole number of turns for each secondary winding, with each whole number selected via engineering design to produce a specific output phase angle for each secondary winding output that is unique relative to the other output phase angles and which enables a connected device having components coupled to each of the secondary winding outputs to exhibit reduced harmonic currents and a higher than 2x current pulse relative to a number of the secondary winding outputs. Also, responsive to a three phase power being applied across the primary winding inputs, each secondary winding output provides an output voltage having a voltage deviation that is within a pre-designated acceptable range relative to a desired voltage for powering the connected device. In the embodiments described, each secondary winding is arranged in a phase shifting configuration to yield the different phase angles of the secondary windings outputs.

A second embodiment provides a system comprising: an electrical device having three legs connected at an electrical neutral, with each leg extending from the electrical neutral to provide one of three outputs, wherein each leg comprises N serially-connected components that each comprises a three phase input and a single phase output; and an AHQ/CPM transformer comprising: a plurality of secondary windings placed around the limb(s) of the magnetic core in a predetermined winding turns configuration to generate three sets of N three phase outputs that are respectively coupled to the N serially-connected components of each leg of the electrical device, where each three phase output of the plurality of three phase outputs has a different phase angle from all other three phase outputs. Each unique phase angle associated with a three phase output of a corresponding secondary winding is determined based on the winding turns configuration utilized for the corresponding secondary winding. The 3N serially-connected components exhibit similar output voltage characteristics based on the input voltage applied. The secondary windings outputs with unique phase angles provided for each output power the serially-connected converters/inverters of the VFD to yield electrical characteristics within the VFD system including: (a) a number of current pulses (current pulse number) that is greater than a total number of the N serially-connected devices (3N) multiplied by two (2); and (b) a substantial reduction in harmonic currents within the VFD system based on the increase in current pulse number, such that the VFD system exhibits and yields minimal harmonic currents.

Multiple different embodiments/configurations of the three phase AHQ/CPM transformer circuit/devices are provided for powering various different configurations of VFDs having different numbers of converter/inverter modules per leg. When combined within a VFD system, providing a power input device, each embodiment of the AHQ/CPM transformer circuit/device yields the resulting operational functionality of substantially increasing the pulse number of the VFD, leading to enhanced harmonic current quashing in the power supply. The resulting current pulse numbers (e.g., 18, 36 pulse, 54 pulse, 72 pulse, and others) exhibited by the transformers/VFD systems will be utilized hereinafter to differentiate the different types of VFD systems. Each such VFD system provides a final three phase output with each phase comprised of a sum of the single-phase output(s) of each converter/inverter on a same leg of the VFD.

In the following detailed description of exemplary embodiments of the invention, specific exemplary embodiments by which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention extends to all devices, which fall within the equivalents of the described embodiments and any appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention. Moreover, the use of the terms first, second, etc. do not denote any order or importance, but rather the terms first, second, etc. are used to distinguish one element from another.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. As utilized within the described embodiments, the following terms are defined as follows:
  (a) AHQ: acronym for "advanced harmonic quashing", which directly references the quashing of the harmonics (current) by the particular type of transformer designed to provide a substantial increased in the pulse number of a connected VFD;
  (a) CPM: acronym for "current pulse multiplier", which directly references the increase (by a multiplication factor greater than one) in the number of current pulses (i.e., the pulse number) of a resulting system as a result of coupling the particular type of transformer to a VFD;

(b) quash/quashing: to put down or suppress transient voltages and/or harmonic currents that may otherwise exist in the power supply, the transformer and devices powered by the transformer;

(c) AHQ/CPM transformer: a transformer that substantially reduces the occurrence and/or effects of harmonic currents in the power supply by significantly increasing the current pulse number of an electrical component/device/system coupled to the outputs of the transformer's secondary winding; and (d) variable frequency drive (VFD) system: an electrical system (or a power input device) that includes both a variable frequency drive and the AHQ transformer windings coupled to the inputs of the converters/inverters of the VFD. The "system" may also include one or more output circuits/loads coupled to the VFD's output. Example VFD systems, illustrated by FIGS. 7, 10, 11, 14 and 17, depict the VFD and the representative transformer windings with corresponding unique phase angles that are applied to each three phase input of the converters/inverters of the VFD. Each VFD system provides a final three-phase power output with each phase of the final three-phase output comprised of a sum of the single-phase output(s) of each converter/inverter on a same leg of the VFD.

The embodiments described herein provide an example AHQ/CPM transformer, transformer design and system that provide input voltage power for various types of electrical devices/systems, such as medium voltage variable frequency drives. Various different (i.e., additional) embodiments of AHQ/CPM transformers are possible, with each embodiment having different topology/configurations and/or numbers of primary and/or secondary windings (e.g., a different number (3N) of secondary winding groups), which yield different functional characteristics when applied to the specific type of electrical power device (e.g., variable frequency drive) for which the particular AHQ/CPM transformer is designed/suited to power. As provided for herein and described below, the representative variable frequency drives each comprise multiple three-phase to one-phase converters/inverters serially-connected on each of three legs of the VFD. The example converters/inverters may include a rectifier and an inverter, and the converters/inverters receive three phase voltage inputs from the three phase implementation of the AHQ/CPM transformer and generate single phase output voltages. The design of the VFD utilized within the illustrative embodiment provides that each converter/inverter exhibits similar output voltage characteristics. For example, in the illustrative embodiment of FIG. 7, described below, each converter/inverter yields substantially the same output voltage (1300V plus or minus some acceptable variance (voltage deviation)) when powered by the connected AHQ/CPM transformer. The combination of the various types of AHQ/CPM transformers coupled to provide power to a corresponding arrangement of electrical components, such as a VFD, is referred to herein as a power input device, and more specifically as a three-phase power input device. Aspects of the described embodiments can also be applicable to other types of power input devices, e.g., a P phase power input device, where P is an integer greater than 1. When utilized specifically with a VFD as the connected electrical device, the power input device is referred to as a VFD system, and several example VFD systems are provided herein.

Referring now to FIG. 1, there is illustrated an example variable frequency drive, which can be used to control the frequency of the electrical power supplied to an alternating current (AC) motor system. It is appreciated that different types of variable frequency drives exist, with the type described herein being made up of multiple three-phase to single-phase converters/inverters. Each of the multiple converters/inverters is electrically isolated from the other converters/inverters. The multiple converters/inverters are then connected in three series circuits to compose three output connectors (with three output phases) of the variable frequency drive. As shown in FIG. 1, the example variable frequency drive 100 has three output legs, output A, output B, and output C, each comprised of four series-connected three-phase to single-phase converter/inverters 105. The legs of the variable frequency drive are connected at a midpoint (electrical) neutral 110 and extend away from the midpoint neutral 110. The opposite end (A, B, C) of each leg provides one/third of the three-phase power output of the variable frequency drive 100. Powering of these types of variable frequency drives (100) requires the use of one or multiple three phase power supply system(s) or power source(s), and this three phase powering is difficult because of the complexity of the variable frequency drive (e.g., multiple isolated three phase inputs are required for the converters/inverters). In addition to the complexity involved in powering these systems, when utilizing these variable frequency drives (100) with the conventional powering systems that are applied, the overall configuration/design manifests/exhibits a high incidence of harmonic currents in the power supply.

A. AHQ/CPM Transformer with Unique Output Phase Angles

Figure 2:
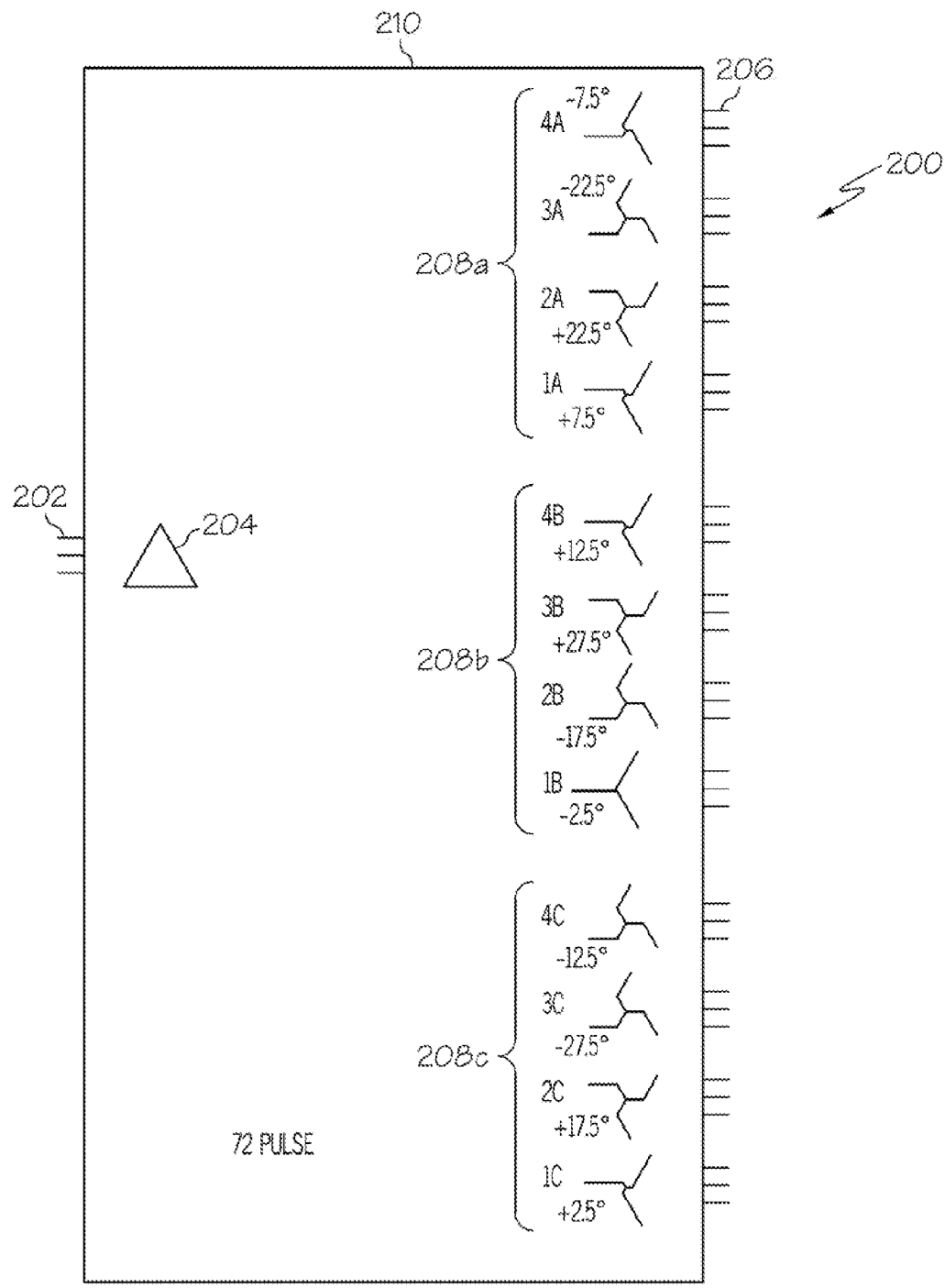
FIG. 2 is a block diagram representation of an advanced harmonic current quashing/current pulse multiplier (AHQ/CPM) transformer with three groups of four three-phase output windings and corresponding terminals/leads, with each output winding exhibiting a unique phase angle, according to one embodiment.

Turning now to FIG. 2, there is illustrated a device view of an example AHQ/CPM transformer designed according to one embodiment for use when powering a connected electrical device having twelve individual components requiring twelve (12) three-phase inputs. As shown, AHQ/CPM transformer 200 comprises an external casing 210, within which the magnetic core (not shown), and the various levels of windings (i.e., the primary winding and secondary windings), and associated insulation are disposed. The AHQ/CPM transformer 200 comprises primary winding 204 wound around the magnetic core and three input terminals/leads 202 which serve as connection points for coupling an external power supply (such as a main power source, not shown) to the primary windings (e.g., primary windings 204) of AHQ/CPM transformer 200. Although not specifically shown, the three input terminals/leads 202 extend from and are the ends of primary winding 204.

The AHQ/CPM transformer 210 also comprises a plurality of secondary windings 208 wound around the magnetic core. Within the various embodiments presented herein, these secondary windings 208 are shown arranged in a zig-zag configuration, but can be configured in any one of several configurations that result in the individual outputs exhibiting a unique phase angle, such as, but not limited to the zig-zag configuration, or a polygon configuration, or an extended delta configuration (in alternate embodiments). The selected configuration is a design choice, and is fully applicable as long as the secondary windings outputs yield the multiple different/unique phase angles desired. As shown, the secondary windings 208 are presented as three groups of N secondary windings (208a, 208b, 208c), where N equals four (4) in the present embodiment. Each of the secondary windings 208 provides a corresponding three phase output and extends to provide corresponding output terminals/leads 206. The input leads of an external device having 3N modules/components that each require three phase power input may be coupled to the respective output terminals/leads 206 that extend from the secondary windings 208. With the illustrative embodiment, the AHQ/CPM transformer 300 provides three separate groups of four (4) three-phase output terminals/leads 206, which extend from secondary windings 208. Based on the winding turns utilized for the twelve individual secondary windings 208 within the AHQ/CPM transformer 200, each of the twelve (12) secondary windings 208 provide an output voltage with an associated unique phase angle (example phase angles of one implementation presented adjacent to the specific secondary windings), relative to the phase angle of the output supplied by the other secondary windings. These unique phase angles are exhibited within the output provided via the terminals/leads 206 and affect the overall harmonics and other characteristics of a connected electrical device, as explained below.

According to the various embodiments described herein, and as further illustrated by VFD system of FIG. 7 (described below), a power input device is generated comprising the AHQ/CPM transformer having outputs coupled to an arrangement of three-phase to single-phase electrical components, with a three phase input of each electrical component coupled to one of the three phase outputs. In the presented embodiments, the arrangement is comprised of three legs of N series-connected electrical devices, where the N electrical devices exhibit similar output voltage characteristics. A terminal endpoint of each of the three legs then provides one phase of a final three phase output of the AHQ/CPM transformer (which is equivalent to the final three phase output of the described VFD systems herein).

In another embodiment, the AHQ/CPM transformer 200 may also include tertiary windings and associated tertiary output terminals/leads (not shown and not germane to the AHQ/CPM functionality described herein).

A.1 Magnetic Core Winding Topology

In the various illustrative embodiments presented herein, a three limb magnetic core is provided, and each group of N secondary windings (e.g., secondary windings 208a, 208b, 208c) is wound around a respective one of three limbs of the magnetic core. The descriptions thus reference this particular three-phase configuration of the magnetic core (i.e., having three limbs). It is however appreciated that in alternate embodiments, a different configuration of the core is possible. That is, the core is not limited to a "three limb" core, but can be any conventional three phase core, such as, a three limb, four limb, five limb or other number of limbs, as well as three (3) single phase cores. When utilized herein, the terms "core" or "magnetic core" or "three-phased magnetic core" mean (or references) any of the various possible three phase core configurations, and the actual configuration utilized can be a design choice. It is therefore understood, that the magnetic core accommodates conventional "three phase" magnetic fields, where the three magnetic fields are 120 degrees apart, plus or minus some tolerance around 120 degrees.

Figure 3A:
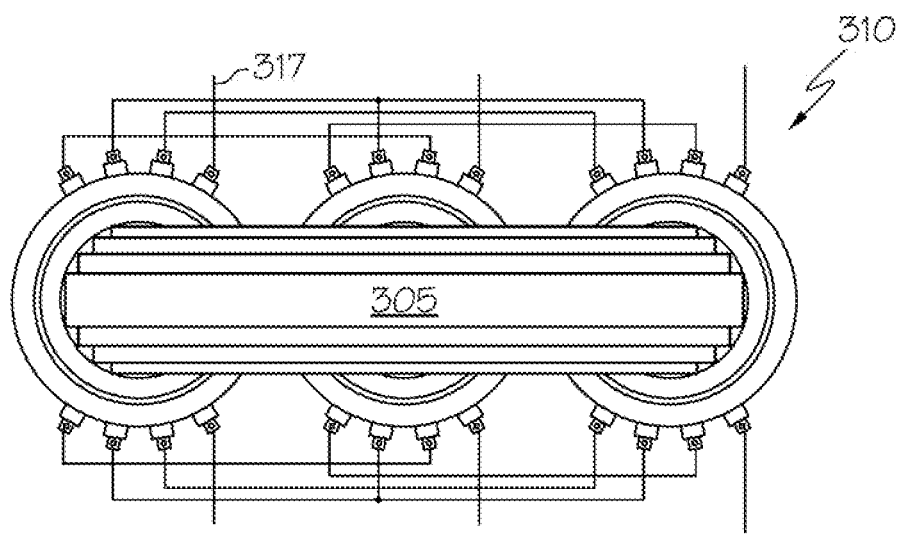
FIGS. 3A-3D provide multiple different views of the placement of the secondary (and primary) windings on/around the magnetic core of the AHQ/CPM transformer of FIG. 2, which yields similar power output and unique phase angle characteristics as the AHQ/CPM transformer of FIG. 2 when coupled to an appropriate electrical device, such as the VFD of FIG. 1, in accordance with one embodiment.
Figure 3B:
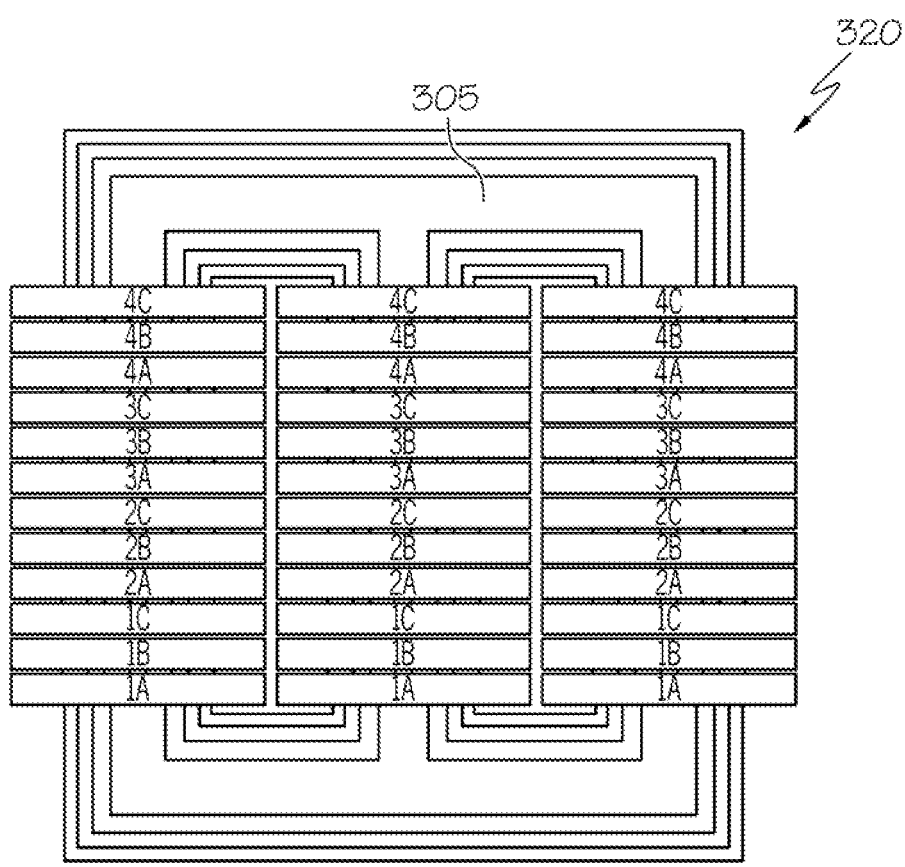
Figure 3D:
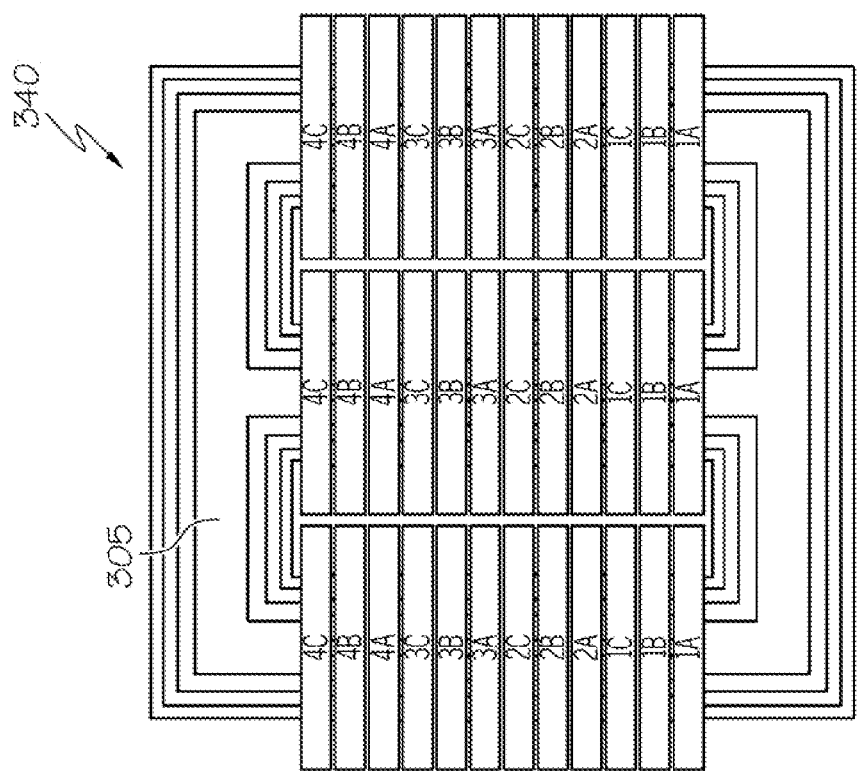
Figure 3C:
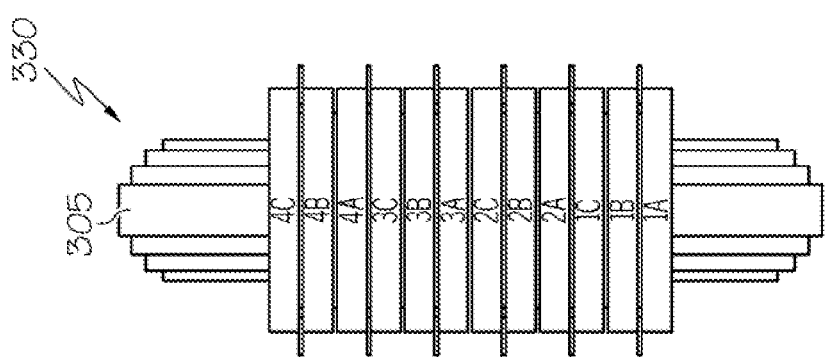
Figure 4:
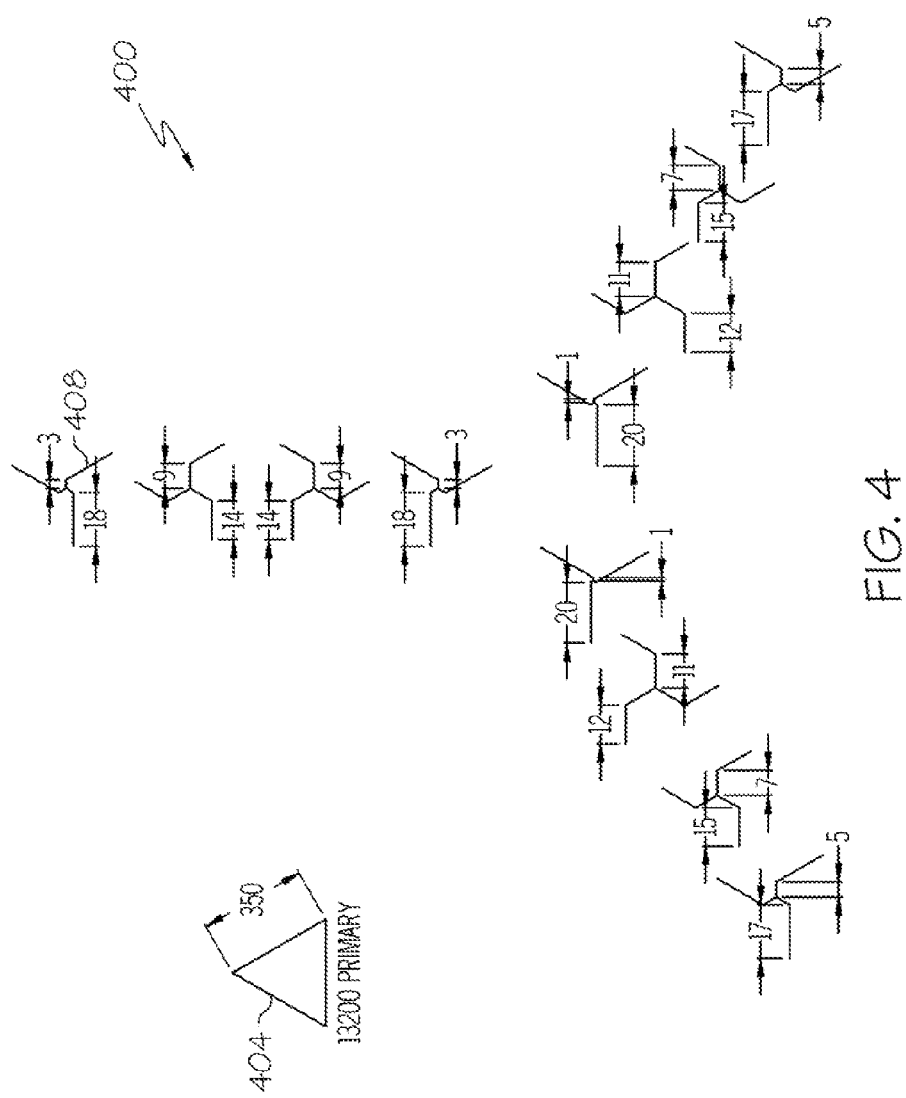
FIG. 4 is a schematic diagram with an expanded view of the secondary windings showing the actual phase angles to the nearest $100^{th}$ of a degree when utilizing whole number turns of primary and secondary windings within the example AHQ/CPM transformer of FIG. 2, according to one embodiment.

FIGS. 3A-3D provide multiple different views of secondary/output windings placed around an example three limb magnetic core 305 of AHQ/CPM transformer 200, designed to provide the output windings topology of FIG. 2 (and FIGS. 4-7, presented hereafter). Four views are illustrated, namely top view 310 (FIG. 3A), frontal view 320 (FIG. 3A), lateral/side view 330 (FIG. 3A), and rear view 340 (FIG. 3A). The top view 310 illustrates the interconnectivity of the windings between the limbs of the magnetic core 305 and the leads 317 extending from the windings, and the remaining views (320, 330, and 340) clearly illustrates the central magnetic core 305 and the secondary windings placed around the magnetic core 205. Within the illustrated views, the secondary windings are labeled as 1A-1C, 2A-2C, 3A-3C, and 4A-4C to correspond to the A, B and C legs of the VFD (see FIG. 7) to which the windings are eventually connected.

Of the four views, frontal view 320 and rear view 340 clearly illustrate the three limbs of the magnetic core (left, center and right limbs) around which the secondary windings (and primary windings) are placed. Also, top view 310 provides one view of the interconnection of the phases of the windings via leads 215 exiting from and extending into the three limbs. Also illustrated are six representative input/output leads 225 by which AHQ/CPM transformer 200 may connect to external devices, such as a main power source (connecting to leads of the primary winding), and one or more electrical devices/loads (connecting to tertiary output leads and/or secondary/output winding leads). The output windings are configured in a radial orientation relative to the other windings (which are covered over by the secondary windings with the exception of their respective input/output leads).

The specific topology of the secondary/output windings 130 may also include certain selected types of intra-winding insulation. Accordingly, with one method of engineering and/or manufacturing the AHQ/CPM transformer 200 can include: providing, based on known/pre-determined output device voltage characteristics, a plurality of first type intra-winding insulators disposed between each output winding group of the plurality of output winding groups provided by the secondary windings; and providing, based on known/pre-determined output device voltage characteristics, a plurality of second type intra-winding insulators disposed between each separate winding of each output winding group. The separate windings of the output winding groups power the N serially-connected adjacent electrical devices in a manner which: (a) subjects the plurality of second type intra-winding insulators disposed between each separate winding of an output winding group to not more than twice the output voltage of each of the electrical devices; and (b) subjects the plurality of first type intra-winding insulators disposed between each output winding group to not more than N+1 times the output voltage of each of the electrical devices. Additionally, the method of engineering/manufacturing the AHQ/CPM can also provide for isolating each level of windings and the first winding from the magnetic core via insulators disposed between each level of windings and between the magnetic core and the primary winding; and positioning leads from the output windings relative to each other such that leads of a first one of the output winding groups do not extend axially across the leads or windings of a different one of said output winding groups.

According to one embodiment, the individual windings within the output winding groups and the output winding groups are electrically insulated (isolated) from one another, with insulators selected (having specific dielectric strengths) based on known/expected voltage characteristics of the devices and topology of the electrical system/device being powered by the output windings. Returning now to FIG. 3, interspersed between the secondary windings are intra-winding insulators, including first type intra-winding insulators 365, placed between each identified output winding groups (A, B and C), and second type intra-winding insulators 360 placed between each winding pair of an output winding group.

With each of the configurations of AHQ/CPM transformers described herein and/or contemplated by extensions of the disclosed embodiment, the leads (terminals) of the output windings (secondary) of a first output winding group do not extend axially across windings of a different one of the output winding groups. Notably, the actual configuration of the secondary windings (zig-zag versus polygon) does not substantially change the resulting views of the magnetic core-winding, although the windings themselves are arranged differently relative to each other from one configuration (e.g., zig-zag) to another (e.g., polygon). It will become clear from the descriptions provided herein, how one would actually construct a polygon output winding topology/configuration for the secondary windings of an AHQ/CPM transformer.

Figure 5:
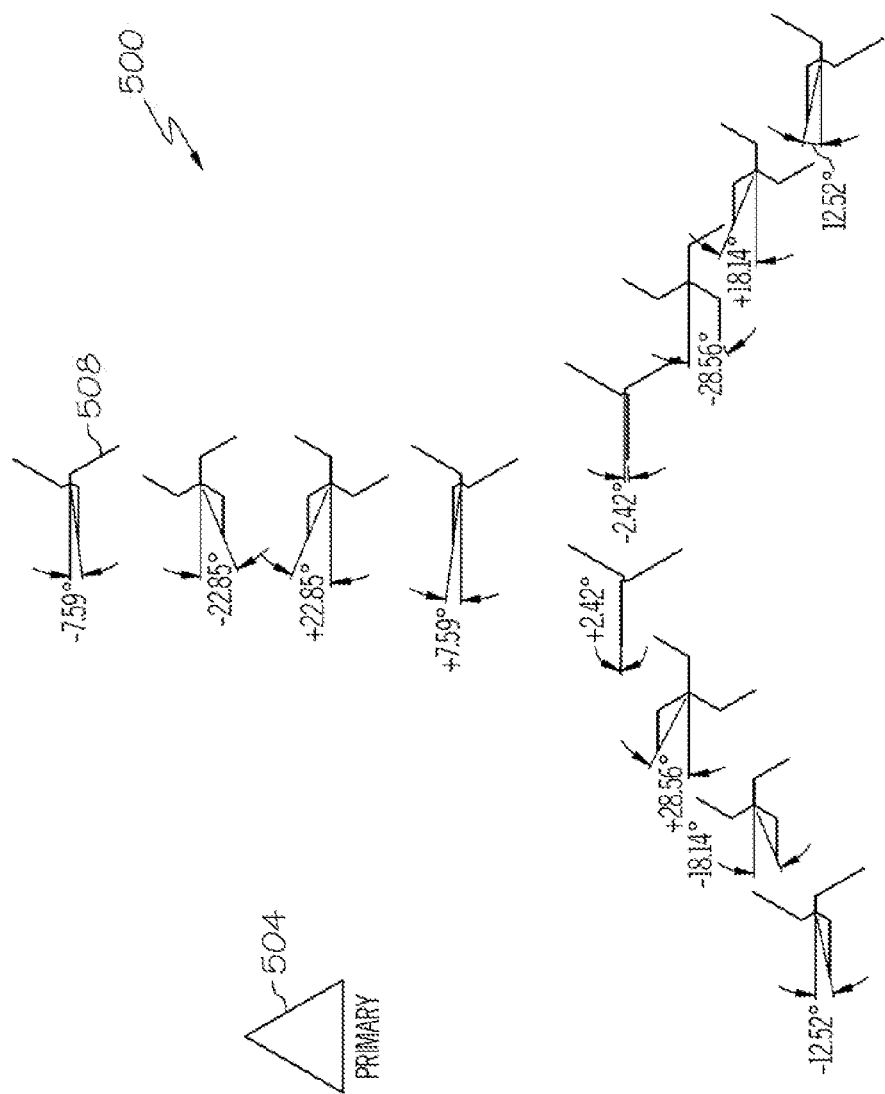
FIG. 5 is a schematic diagram illustrating the number of turns for each of the secondary windings to generate the unique phase angles illustrated by FIG. 4, according to one embodiment.
Figure 6:
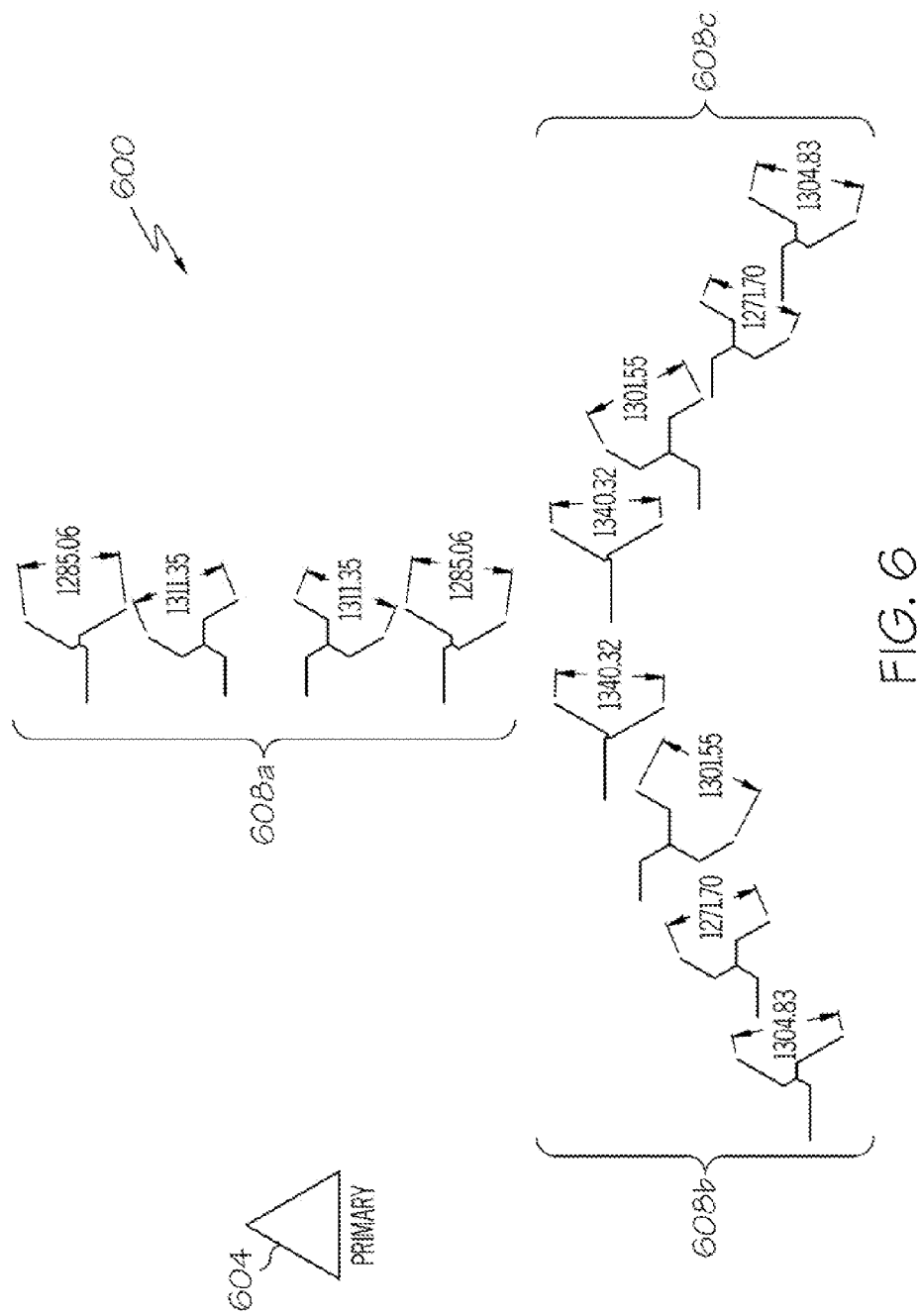
FIG. 6 illustrates the variation in the output voltages across the individual inverter/converter when the AHQ/CPM having the unique phase angles of FIG. 4 based on the secondary winding turns provided by FIG. 5, in accordance with one embodiment.

One important aspect of the design/configuration of the windings of the AHQ/CPM transformer is that winding turns around the magnetic core 305 must be whole number turns. This an important design consideration in selection of the number of turns for the primary winding and for each of the secondary windings that enable the transformer to yield the desired output characteristics, including a unique phase angle for each secondary winding output. Given this requirement of whole number turns, an example winding scheme for AHQ/CPM transformer 200 is presented by FIG. 4, and the resulting phase angles and voltages across each three phase output 206 is provided by FIGS. 5 and 6, respectively. As provided by FIG. 4, the respective turns for each leg of secondary windings 408 comprises a whole number value, as does the turns utilized for primary winding 404. With these numbers of turns utilized within the transformer topology/configuration, the resulting phase angles (i.e., the actual measured phase angles in one implementation) for each resulting three phase output of the secondary windings 508 are no longer equal to precisely desired phase angles and are more accurately depicted up to the one hundredth value (FIG. 5). Additionally, as shown by FIG. 6, the resulting output voltage across the three phase outputs of the groups of secondary windings 608a, 608b, 608c are shifted from the desired output voltages by a voltage deviation that falls within an acceptable range of output voltages for the particular device being powered via the AHQ/CPM transformer.

B. VFD System (Power Input Device) Comprising AHQ/CPM Transformer with Unique Output Phase Angles With reference now to FIG. 7, there is illustrated an example variable frequency drive (VFD) system 700 comprising a VFD 710 coupled to output leads/terminals of secondary windings 208a, 208b, 208c of an AHQ/CPM transformer, such as AHQ/CPM transformer 200 of FIG. 2. As introduced above, the VFD system 700 is an example of a power input device, where the components connected to the output windings are converters/inverters arranged as a VFD. The VFD 710 comprises three sets of N converters/inverters 705, which are connected in three series circuits (each referred to herein as a "leg" because of the illustrated three-limb configuration), each providing one third of a three phase output of the variable frequency drive 710, labeled A, B and C. As with VFD 100 of FIG. 1, VFD 710 is configured with three output legs, output A, output B, and output C, and the output legs of the VFD 710 are connected at a midpoint neutral 710. When power is applied to the converters/inverters 705 (via the three phase outputs of the connected AHQ/CPM transformer 200) a final three phase device output (A, B, C) is provided with each phase of the final three phase output comprised of a sum of the single-phase output(s) of each converter/inverter on a same leg (A, B, or C) of the VFD 710. In the illustrative embodiment, the VFD system 700 includes external casing 750, which encloses/encases the main electrical components of the AHQ transformer and/or VFD system. The final three phase power output (A,B,C) of the VFD system 700 is provided at output terminals/leads 760. While illustrated as being external to the casing 750, it is appreciated that the actual location of the output terminals for the final three phase output can be internal to the casing 750, in alternate configurations of the VFD system 700. Input terminals/leads 702, shown external to casing 750, can be the input terminals/leads of AHQ/CPM transformer 200 at which a three phase power supply can be connected to power the VFD system 700.

In the illustrated embodiment, N equals four (4), and thus each output leg has four series-connected three-phase to single-phase converter/inverters 705. Thus, as provided by the embodiment of FIG. 7, example VFD 710 comprises multiple (twelve/12) three-phase to single-phase converters/inverters 705, with four converter/inverter modules serially-connected on each output leg. The numbers of converters/inverters per leg of the VFD may vary depending on the specific embodiment being implemented, and the specific VFD system topology of FIG. 7 is thus provided solely for illustration. Except for the series connections, each of the multiple converters/inverters 705 is electrically isolated from the other converters/inverters 705.

Figure 7:
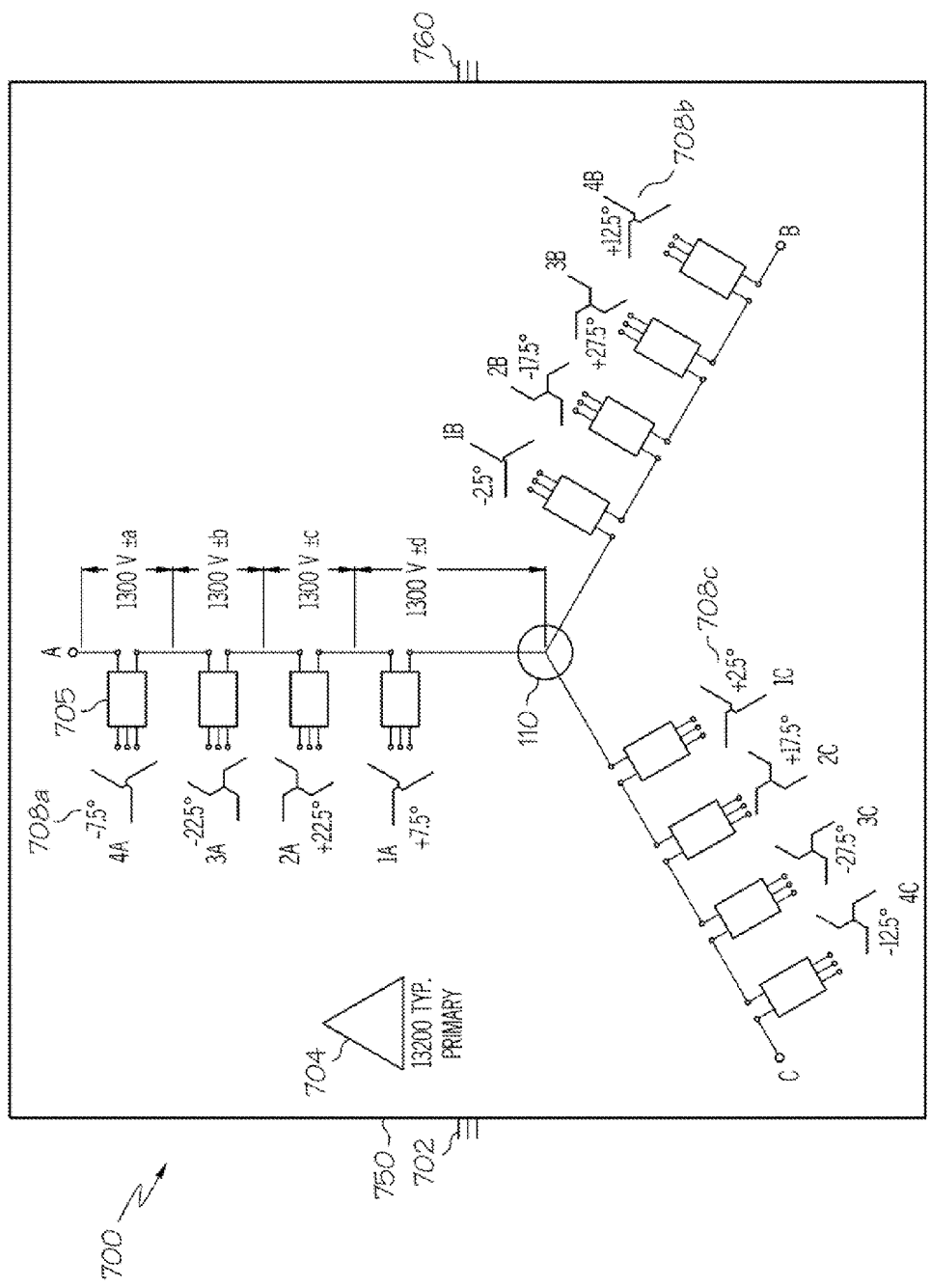
FIG. 7 is a schematic diagram of an example 72 pulse variable frequency drive (VFD) system, illustrating the phase relationships of the primary and secondary windings of an AHQ/CPM transformer which feed the twelve three phase inputs of the three-phase to single-phase converter/inverter modules of a VFD, according to one embodiment.
Figure 8:
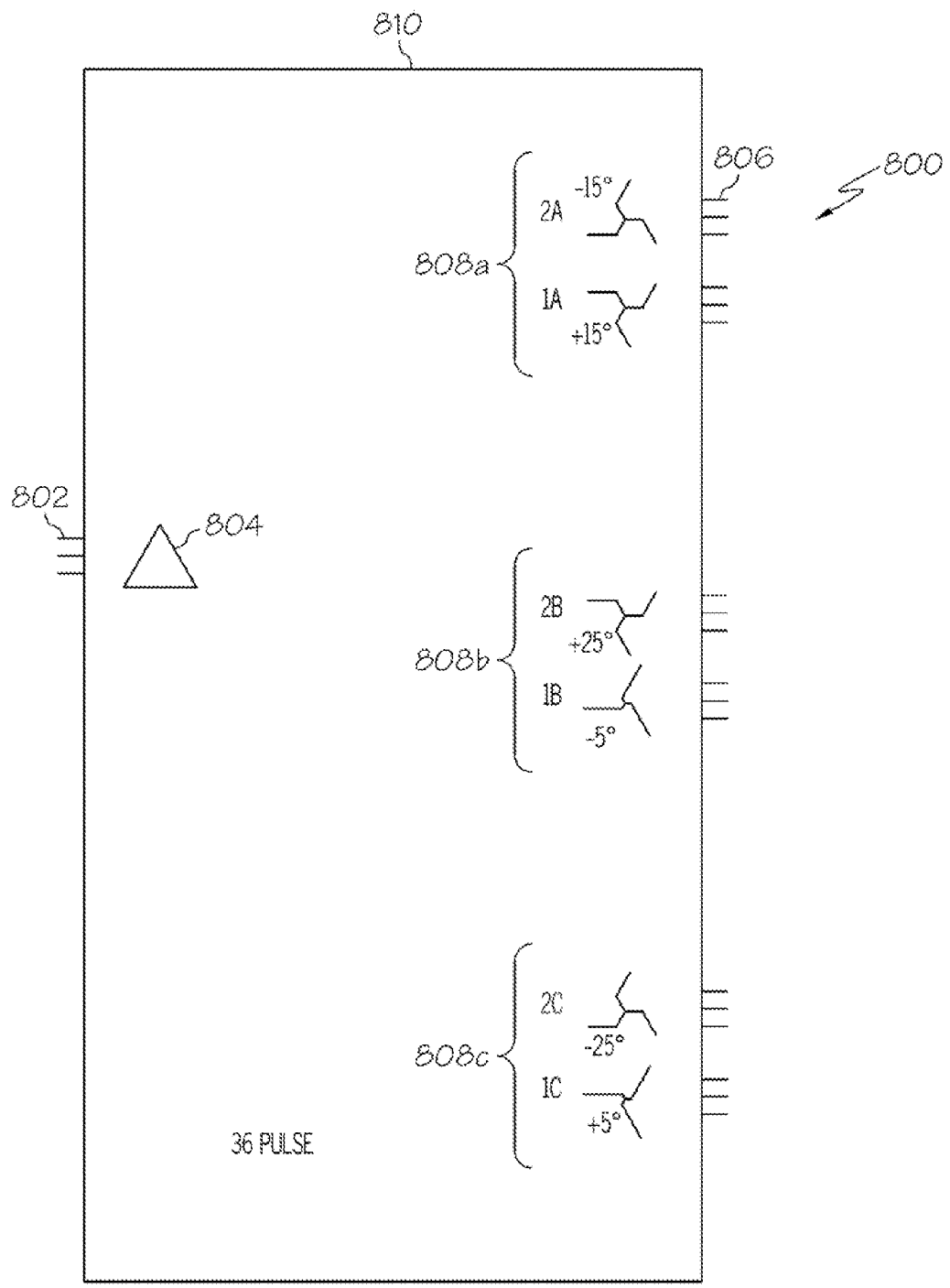
FIG. 8 is a block diagram representation of an AHQ/CPM transformer with three groups of two three-phase output windings and corresponding terminals/leads, with each output winding exhibiting a unique phase angle, according to one embodiment.
Figure 9A:
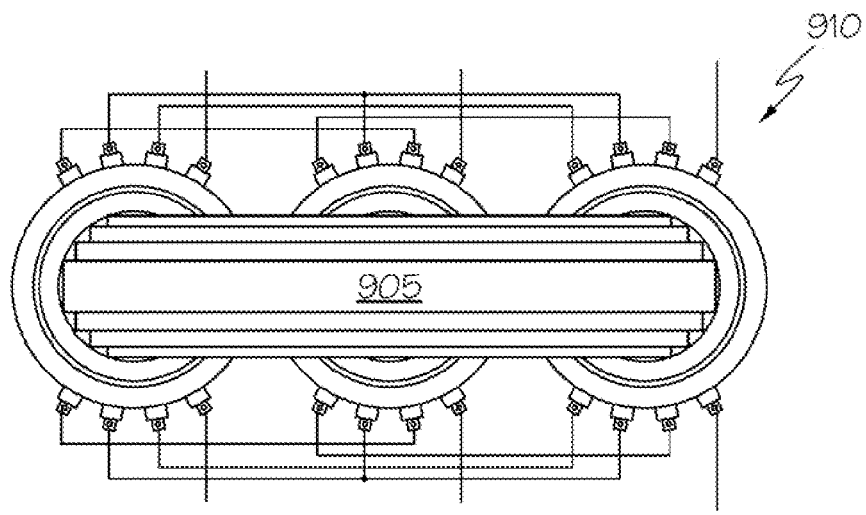
FIGS. 9A-9D provides multiple different views of the placement of the secondary (and primary) windings on/around the magnetic core of the AHQ/CPM transformer of FIG. 8, which yields similar power output and unique phase angle characteristics as the AHQ/CPM transformer of FIG. 8 when coupled to an appropriate electrical device, such as a VFD with six converters/inverters, in accordance with one embodiment.
Figure 9B:
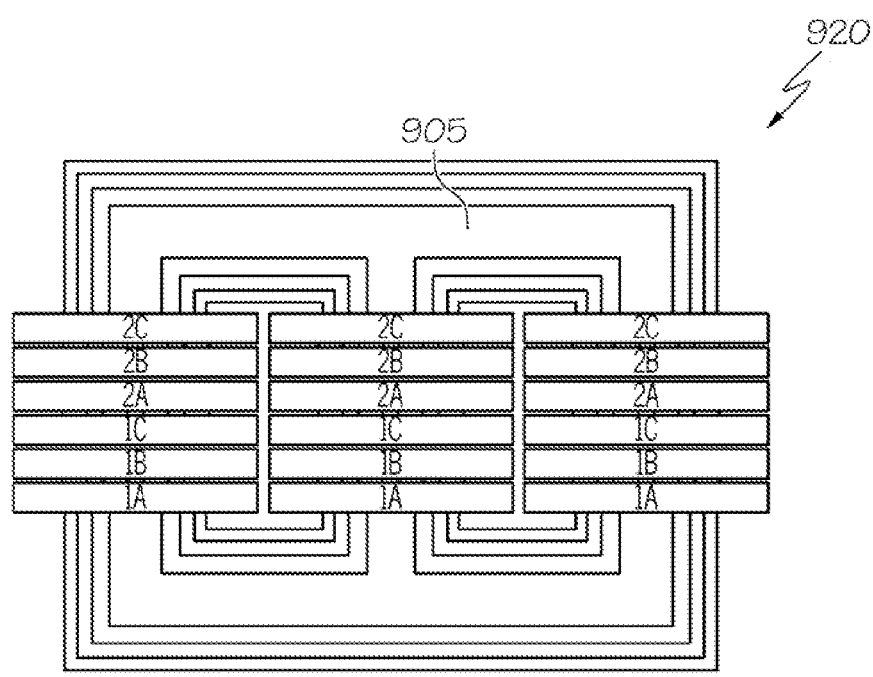
Figure 9D:
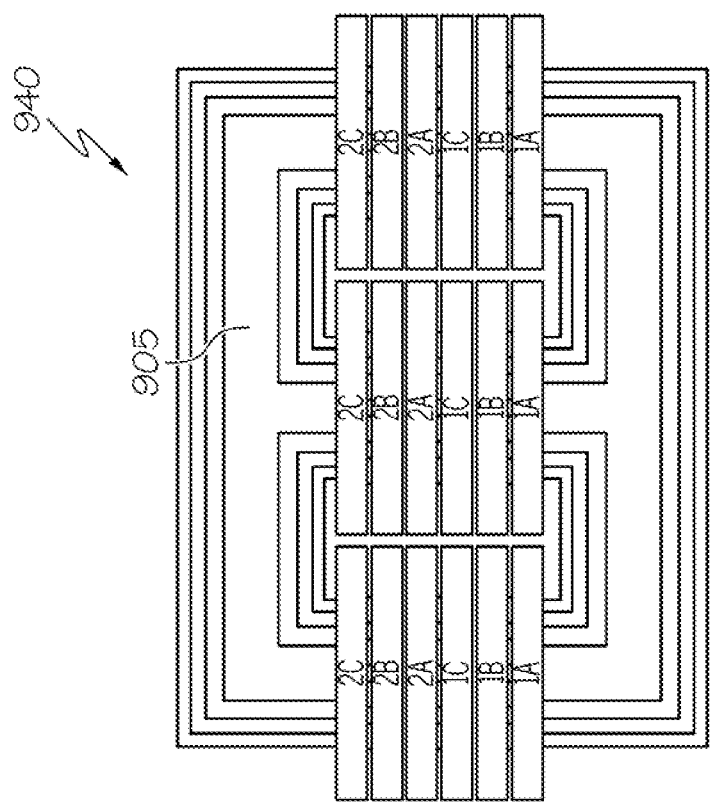
Figure 9C:
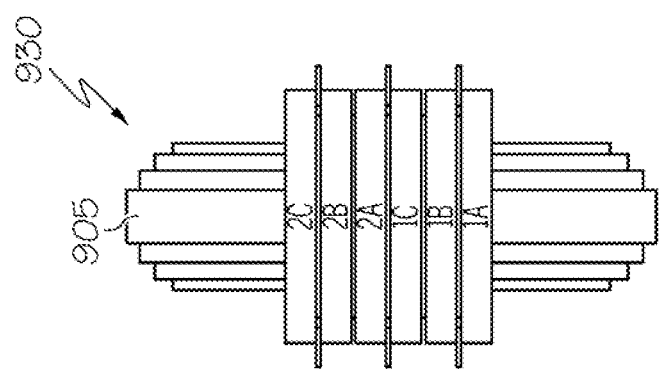

According to FIG. 7, example VFD system 700 includes a three legged variable frequency drive (710) that is being powered by an example three phase AHQ/CPM transformer. The AHQ/CPM transformer is illustrated/represented by two levels of transformer windings, namely secondary windings (or output windings) 708 and primary windings 704. Other embodiments may provide for AHQ/CPM transformers with tertiary windings; However, the primary focus of the embodiments described herein are on the secondary/output windings of AHQ/CPM transformer, which provides specific phase angle functionality that applies regardless of whether the AHQ/CPM transformer is designed with or without tertiary windings. The design, structure, configuration, and/or topology and resulting functionality and/or exhibited electrical characteristics of the AHQ/CPM transformer and in particular the configuration of the windings relative to each other are therefore variable and any alternate design which yields similar functional output with respect to the unique phase angles and resulting higher pulse number is assumed to be covered by the invention and or to fall within its equivalents.

Each of the three series circuits of VFD 710 is coupled to the other series circuits at the neutral 120, with the opposing end for each series circuit providing the single output phases A, B, and C, respectively. These series circuits of isolated converter/inverters 705 are coupled to three groups of four three-phase outputs (i.e, groups 1A-4A, 1B-4B, and 1C-4C) of the secondary windings 208/708 of a representative AHQ/CPM transformer, and the converters/inverters 705 provide somewhat similar output voltage characteristics. As provided by FIG. 7, each secondary/output winding 708 is provided an alphanumeric label (e.g., 1A, 2A, 3A, 4A), where the letter (A, B or C) represents the leg/output phase of the VFD to which the voltage input is applied, while the number represents the physical count of which one of the sequence of inverters/converters 705 on the leg has its inputs coupled to the particular voltage input/secondary winding. Thus, "3C" references the secondary winding(s) 708 that provide a voltage input to the third converter/inverter 705 on leg C of the VFD 710. The voltage input received from secondary winding 3C would then be phase shifted relative to the voltage input of every other secondary winding.

As shown by FIG. 7, each converter/inverter 705 receives a different three phase input from secondary/output winding 708. As also shown, each converter/inverter along example leg A coupled to the N three phase outputs 206a (FIG. 2) of the secondary windings 708a yields an output voltage of 1300 volts plus or minus some voltage delta (to yield a voltage variance from an ideal voltage of 1300V), which deltas and/or voltage variances are a characteristic exhibited by the AHQ transformer outputs based on the number of whole number turns utilized for each of the secondary windings 708. The selected ideal voltage of 1300V is provided solely for example, and the actual ideal voltage of the output device(s) may be of any value. Additionally, in practical implementation, with an ideal voltage of 1300V, given the presence of the variances (illustrated as a plus or minus variance of value a, b, c, and d, respectively) from the ideal voltage, the actual output voltages across each converter/inverter may be similar to those voltages shown in FIG. 6. Different lower case alphanumeric characters (a, b, c, d . . . ) are provided for each output voltage to indicate that the actual voltages may vary differently for each converter/inverter 705. As can be deduced from the example resulting voltages of FIG. 6, the value of the variances (e.g., a, b, c, d) can be a real number value.

Returning to the illustrative embodiment of the VFD system 700 with example AHQ/CPM transformer, the primary windings 704 of the example AHQ/CPM transformer 700 are arranged in a delta configuration. The secondary windings are arranged in a zig-zag configuration, with a different zig-zag configuration utilized for each output winding group to provide specific unique phase angle relationships per output winding group. This different arrangement of the secondary windings per output winding group enables the AHQ/CPM transformer to exhibit specific operational characteristics in the VFD system 700, including providing an increase in the current pulse number of the attached VFD 710 by a multiplication factor of three (3) (i.e., greater than two and up to six), while substantially reducing the harmonic currents.

Each output winding group terminates with three phase output leads that are then coupled to three phase inputs of the converters/inverters 705 of the VFD 710. In order to generate a pulse number of magnitude greater than two (2) times and up to six times (6×) the number of converters/inverters 705 in the VFD 710, each output winding group has a different zig-zag topology, which results in creation of multiple three phase transformer outputs with different phase angles when applied to the respective inputs of the converters/inverters 705. The exact number of turns and representative topology is a design feature that is variable, based on a calculation of the resulting phase angles desired in the secondary output winging groups 708. As shown by the different zig-zag topology of each of the secondary windings 708, the pairs of secondary windings for each representative three phase output 206 may include a combination of different numbers of windings in the three phase directions.

The output groups of secondary windings provide four voltage inputs (illustrated by the particular four secondary/output windings 708 corresponding to each of the converters/inverters 705 per leg of VFD 710). The four converter/inverters 705 of each output phase (A, B, and C) are powered from four (3) three-phase voltages that are phase-shifted relative to one another and which are also phase-shifted relative to the other eight (8) three-phase voltages generated by the secondary winding groups to power the other converters/inverters of the other legs (output phases) of VFD 710. Thus, the twelve (12) total voltage inputs (four per leg of the VFD 710) are phase shifted relative to each other, according to a pre-calculated design scheme that enables the benefits described herein. The illustrated and above described topology of secondary output windings 708 relative to the converters/inverters 705 in each leg of VFD 710 results in a relatively low harmonic content within the VFD system 700 and any connected output devices/loads.

As introduced above, alternate embodiments are possible in which the actual configuration of the secondary windings can vary. For example, the secondary windings of a different AHQ/CPM transformer may be arranged in a polygon configuration. The unique phase angle relationship between each of the nine (or different number of) output voltages (from secondary windings) would however still be provided within the VFD system to support the increased pulse number and associated functionality.

C. AHQ/CPM Transformers with M-Pulse VFD Systems Configuration

Various alternate embodiments provide different orientations/designs/configurations and/or topologies of AHQ/CPM transformers based primarily on the expected usage of the AHQ/CPM transformer. For example, different AHQ/CPM transformers are designed to power different designs/configurations of variable frequency drives, as well as other devices for which the functionality and/or output characteristics provided by the AHQ/CPM transformers may be suited. The input configurations of these drives/devices (e.g., the number of individual components that need to be individually powered) also determine and/or indicate the respective configuration of AHQ/CPM transformers that can be designed for and utilized to power these drives/devices.

The above described configuration of VFD system 700 provides a 72 pulse VFD system based on the number of current pulses supported by the specific design utilizing a VFD (710) with twelve converter/inverters powered by twelve three phase outputs each having a unique phase angle. Different embodiments of VFD systems are provided yielding different numbers of current pulses based on the number of converters/inverters provided by the powered VFD. FIGS. 10-11, 14 and 17 illustrate examples of these alternate embodiments of VFD systems based on AHQ/CPM transformers designed according to FIGS. 8 and 9, and FIGS. 12 and 13, and FIGS. 15 and 16, respectively.

Figure 10:
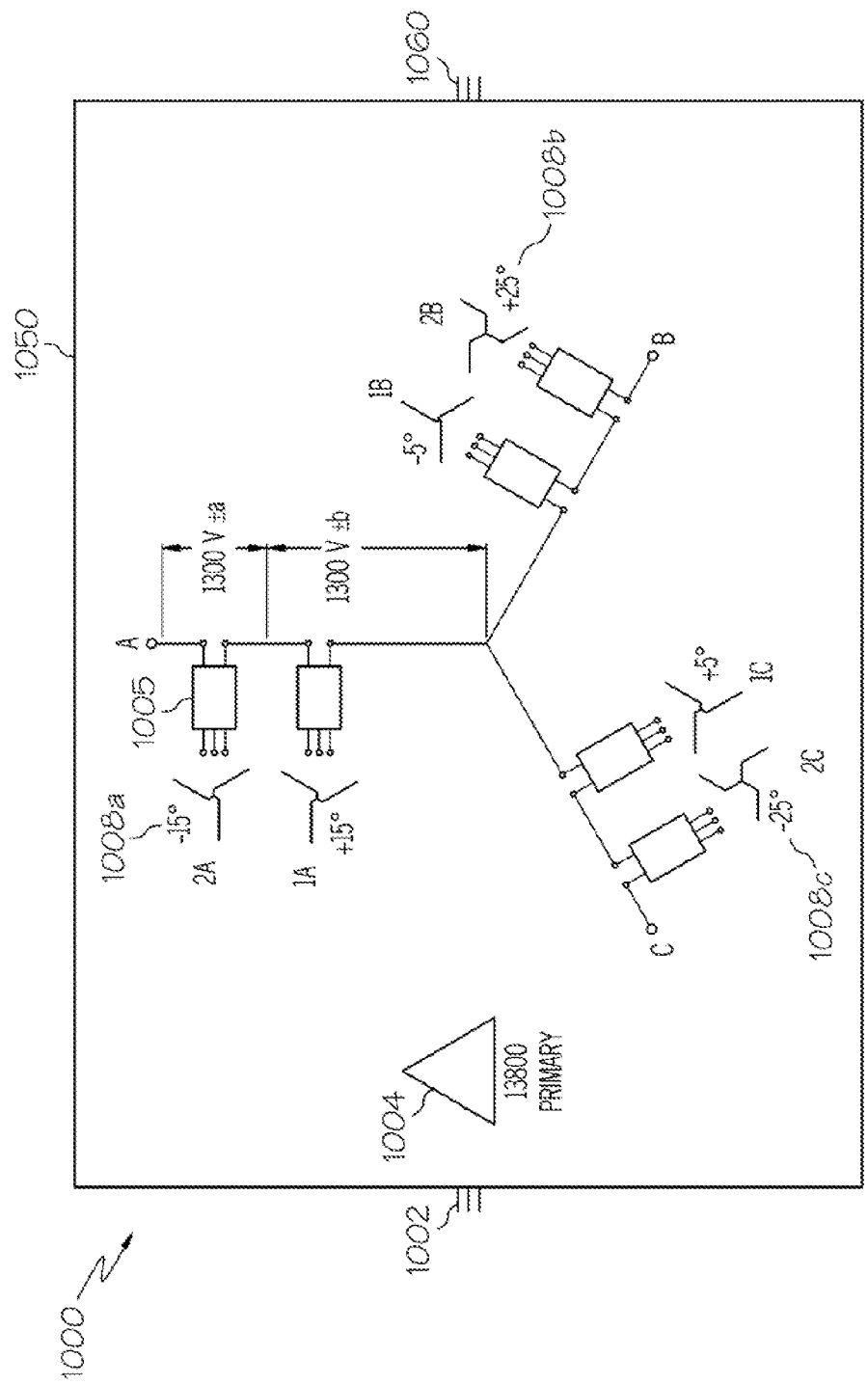
FIG. 10 is a schematic diagram of an example 36 pulse VFD system, illustrating the phase relationships of the secondary windings of the AHQ/CPM transformer which feed the three phase inputs of three sets of two multiple three-phase to single-phase converter/inverter modules of a VFD, according to one embodiment.
Figure 11:
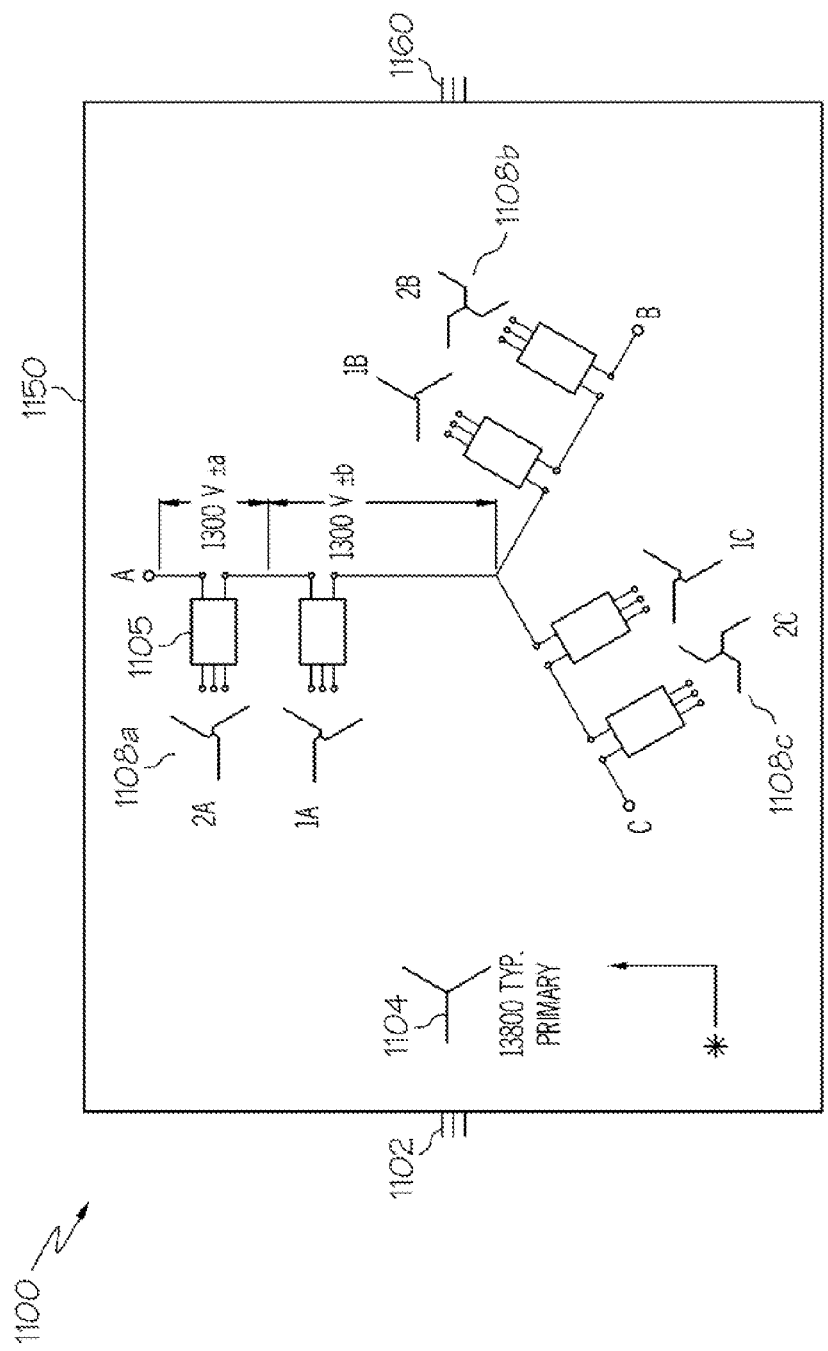
FIG. 11 is a schematic diagram of an example 36 pulse VFD system, with a different configuration of the primary winding of the AHQ/CPM transformer compared to the primary winding of the AHQ/CPM transformer of FIG. 10, in accordance with one embodiment.

Specifically, FIGS. 10 and 11 present two embodiments of a 36 pulse VFD system 1000, 1100, each designed with two converter/inverters 105 per leg of the VFD 1010, 1110. The converters/inverters 1005/1105 are connected to and powered by respective unique phase angled outputs of secondary windings 1008, 1108 of an AHQ/CPM transformer 800. As illustrated in FIG. 10, primary winding 1004 of AHQ/CPM transformer is arranged in a delta configuration, while FIG. 11 illustrates the primary winding 1104 arranged in a wye configuration. The output voltages across the converters/inverters 1005/1105 are within some deviation from the example desired voltage (1300V), and the variances for each voltage can be different (e.g., plus or minus a, b, . . . ). It is appreciated that the input winding 1004/1104 can be any one of a plurality of different three phase configurations without affecting the functional characteristics of the AHQ/CPM transformer (800). The relevant winding configuration for providing the unique phase angles are provided by the winding configuration of secondary windings (1A-1C, 2A-2C) around the magnetic core 905 as illustrated by the different views (910, 920, 930, 940) of FIGS. 9A-9D. Examples of the unique phase angles generated are then provided by example transformer 800 of FIG. 8.

Figure 12:
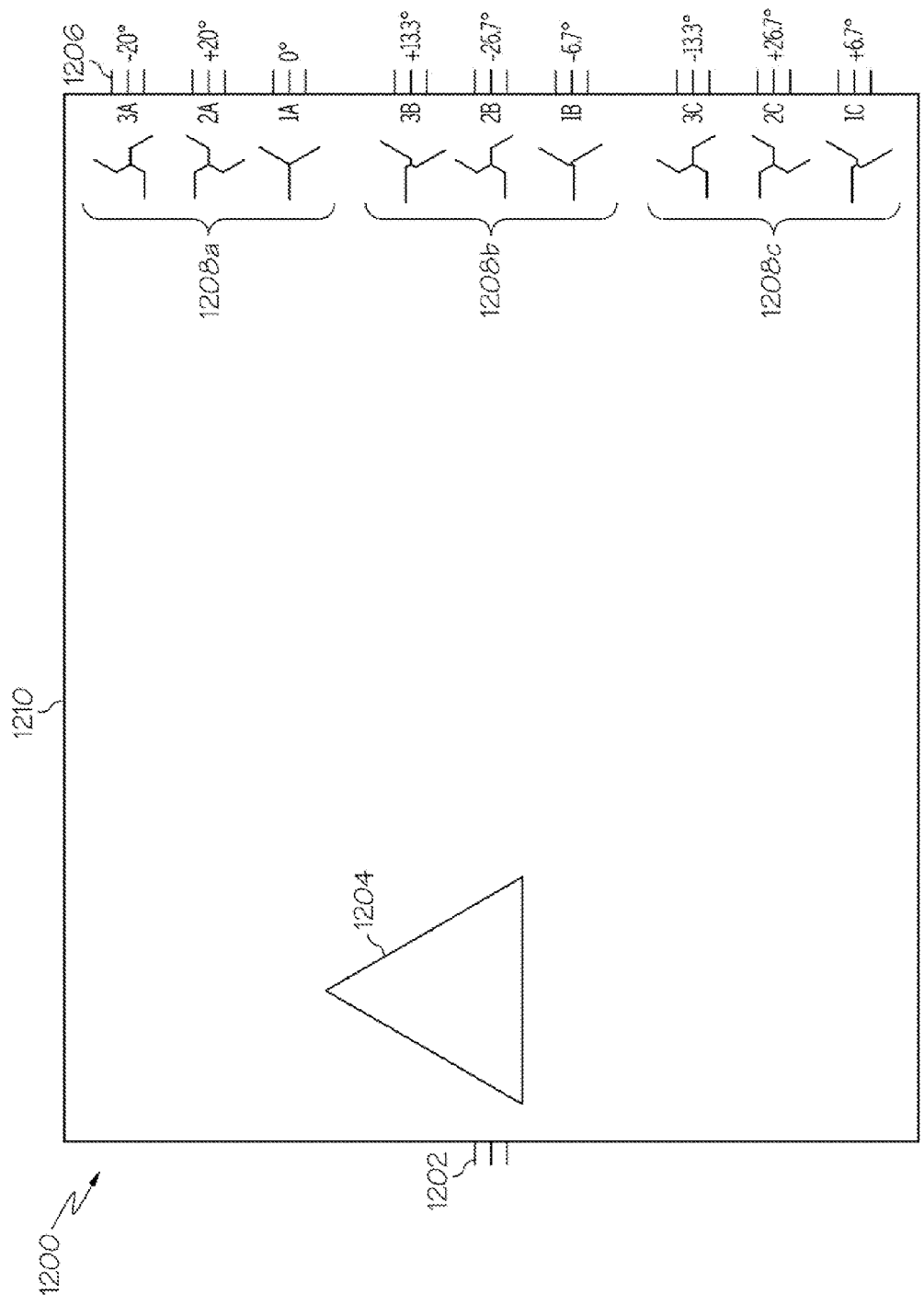
FIG. 12 is a block diagram representation of an AHQ/CPM transformer with three groups of three three-phase output windings and corresponding terminals/leads, with each output winding exhibiting a unique phase angle, according to one embodiment.
Figure 13A:
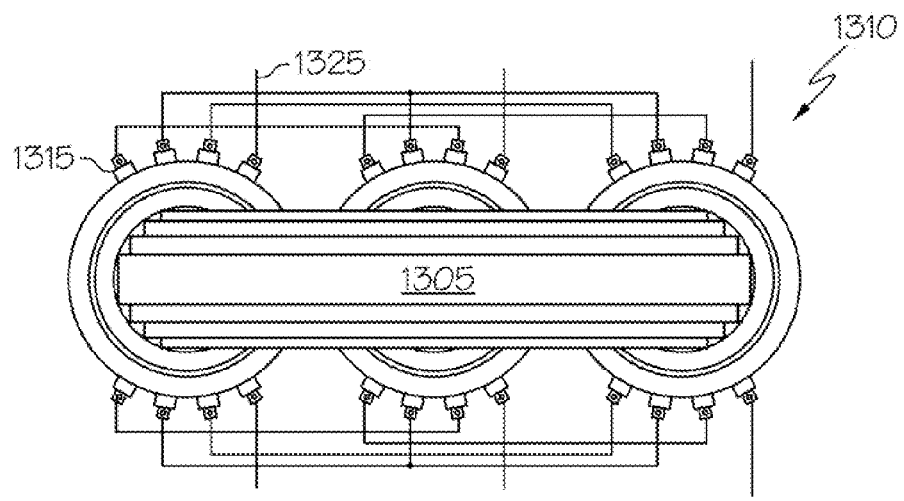
FIGS. 13A-13D provides multiple different views of the placement of the secondary (and primary) windings on/around the magnetic core of an AHQ transformer, which yields similar power output (unique phase angle) characteristics as the AHQ/CPM transformer of FIG. 12 when coupled to an appropriate electrical device, such as a VFD with nine converters/inverters, in accordance with one embodiment.
Figure 13B:
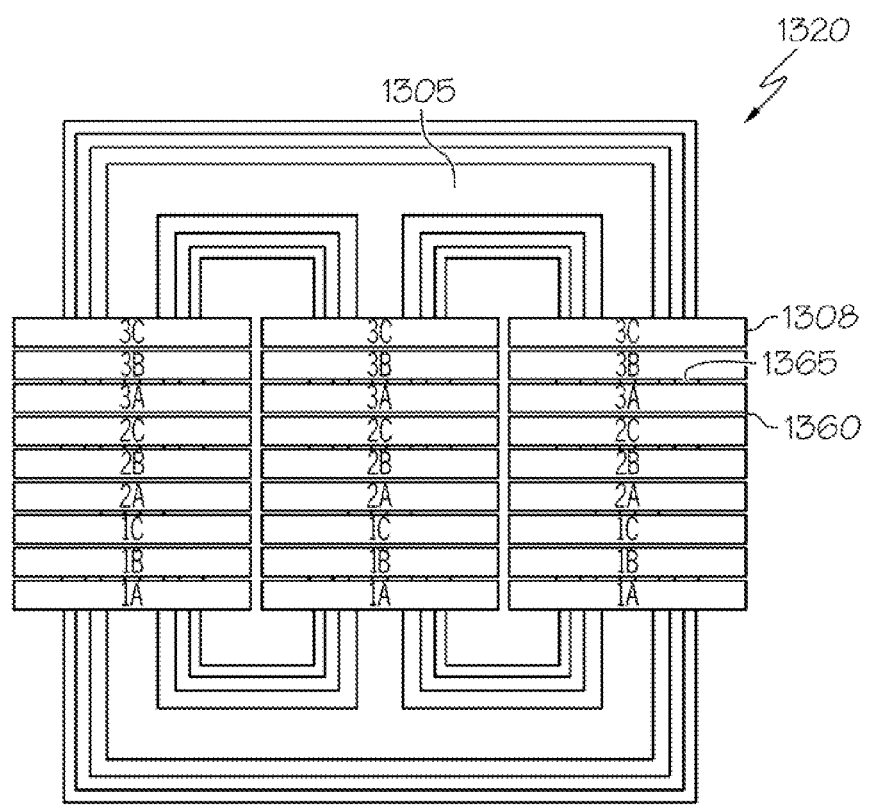
Figure 13D:
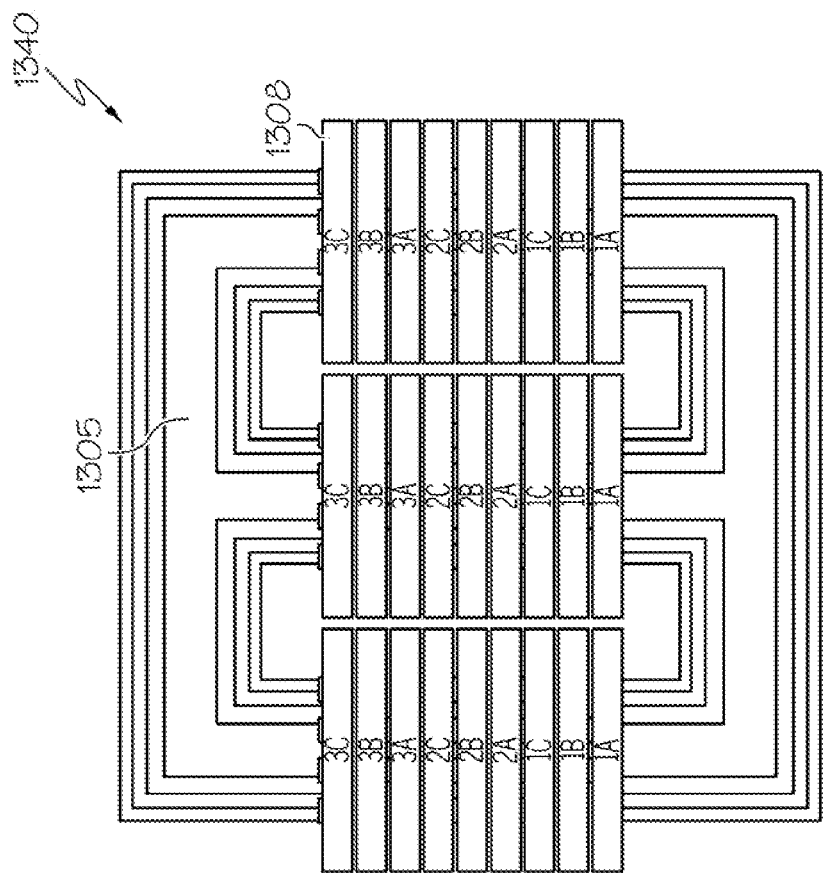
Figure 13C:
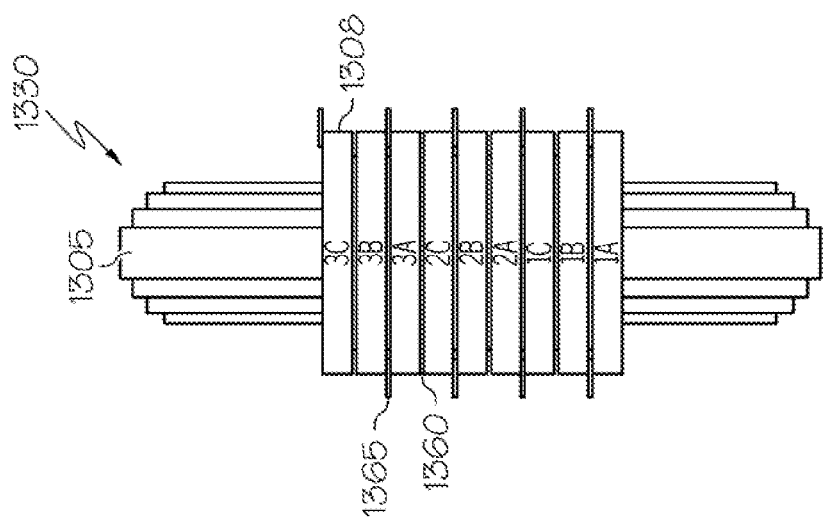
Figure 14:
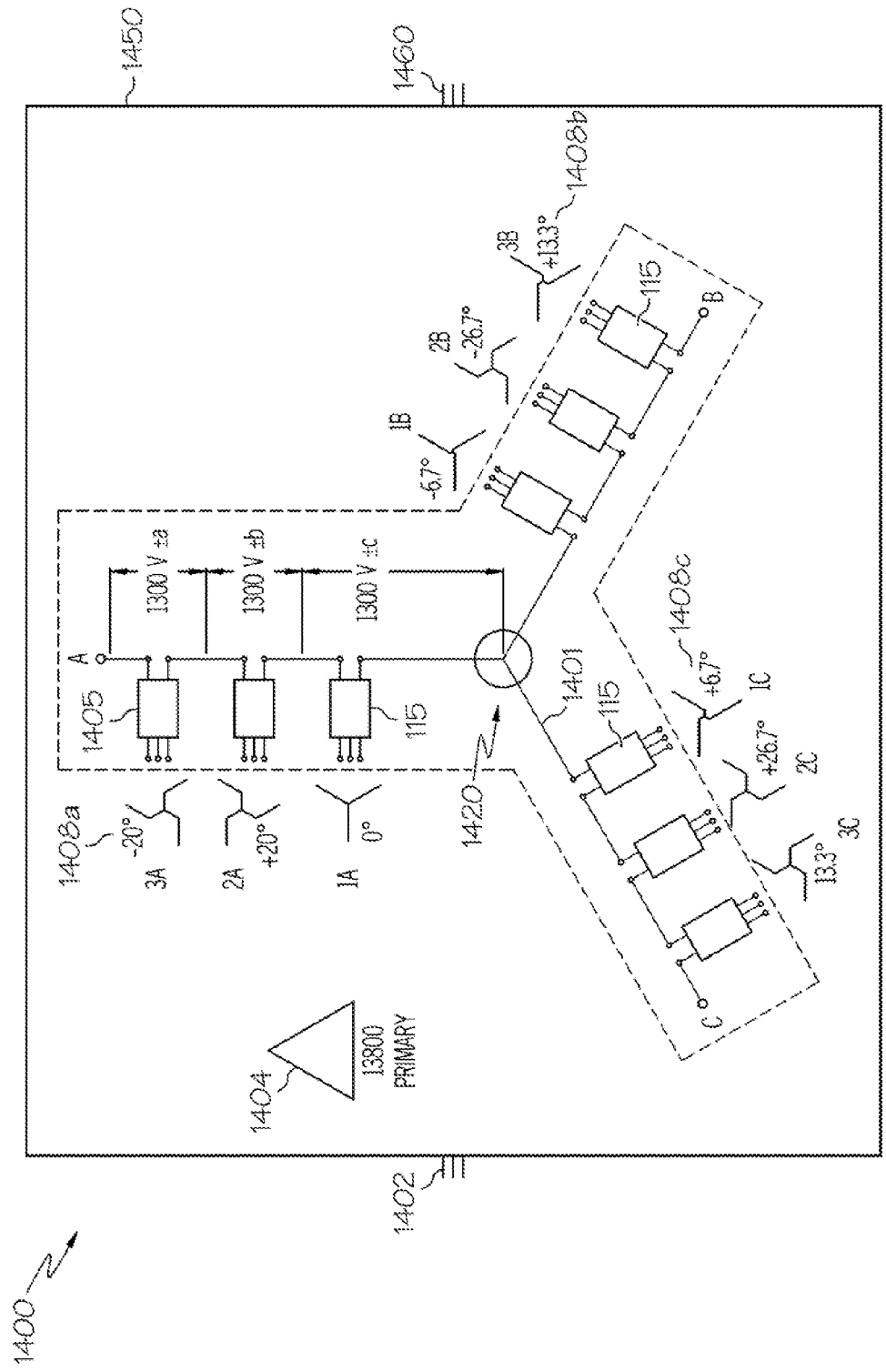
FIG. 14 is a schematic diagram of an example 54 pulse VFD system, illustrating the phase relationships of the primary and secondary windings of an AHQ/CPM transformer which feed the three phase inputs of multiple three-phase to single-phase converter/inverter modules of a VFD, according to one embodiment.

FIG. 14 illustrates one embodiment of a 54 pulse VFD system 1400 designed with three converter/inverters 1405 per leg of the VFD 1410. The converters/inverters 1405 are connected to and powered by respective unique phase angled outputs of secondary windings 1208 of an AHQ/CPM transformer 1200 (FIG. 12). The output voltages across the converters/inverters 105 are within some voltage deviation from the example desired voltage (1300V), and the variances for each voltage can be different (e.g., plus or minus a, b, . . . ). The relevant winding configuration for providing the unique phase angles are provided by the winding configuration of secondary windings (1A-1C, 2A-2C, 3A-3C) around the magnetic core 1305 as illustrated by the different views (1310, 1320, 1330, 1340) of FIGS. 13A-13D. Examples of the unique phase angles generated are then provided by example AHQ/CPM transformer 1200 of FIG. 12, which depicts the unique phase angles corresponding to each three phase output 1206 generated by the secondary windings 1208/1408. Also provided within the illustrated embodiment of the VFD system 1400 is an external casing 1450 that can, in some implementations, be placed around the entire VFD system, thus encasing/enclosing the AHQ/CPM transformer 1200 and connected VFD 1410. Terminals/leads 1402 of the three phase input (of the AHQ/CPM transformer 1200) as well as the terminals of leads 1460 of the three phase outputs (A, B, C of the VFD 1410) can then be provided external to the casing 1450, in one embodiment, for connection to a three phase power supply and a load, respectively.

Figure 15:
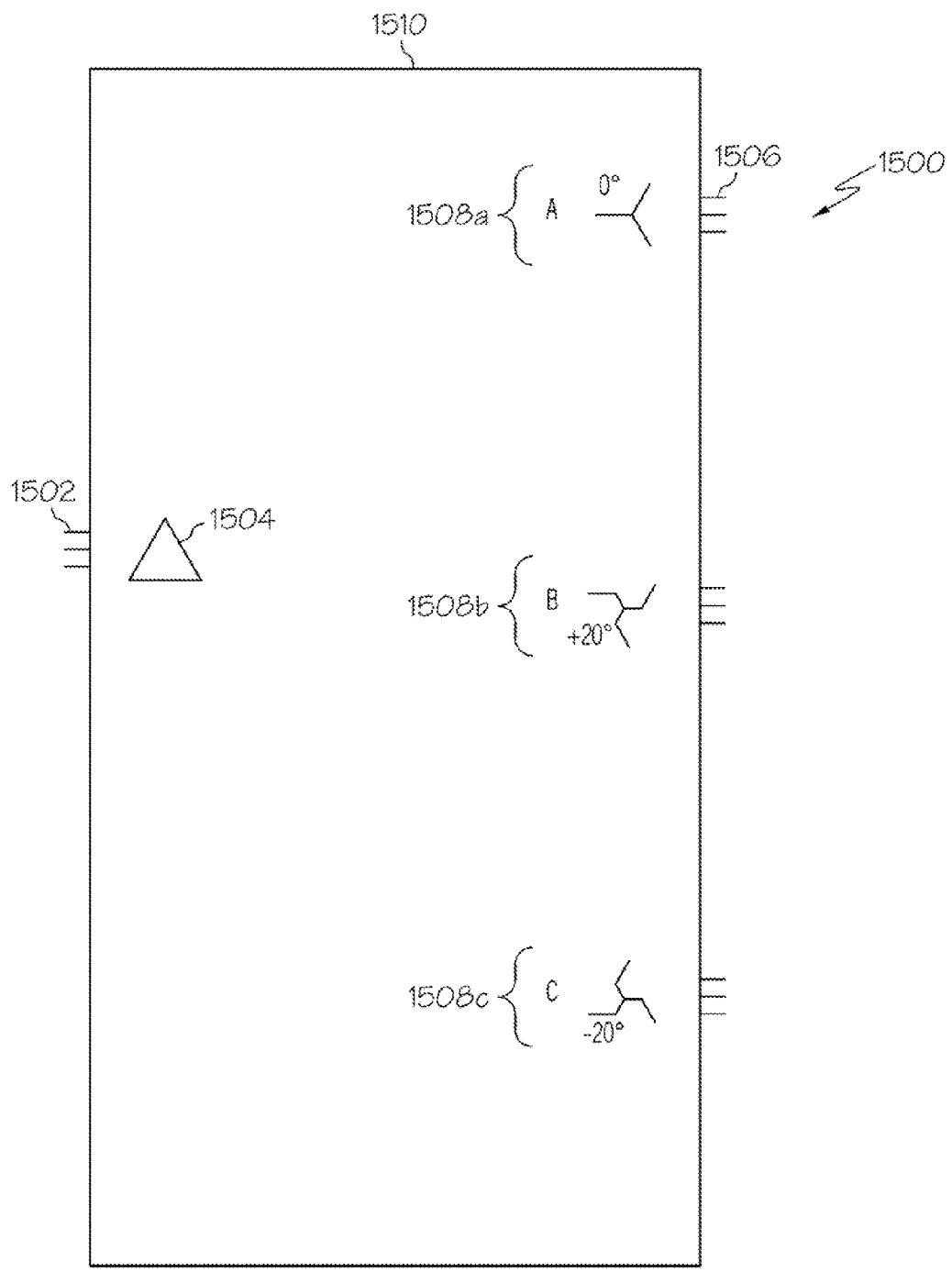
FIG. 15 is a block diagram representation of an AHQ/CPM transformer with three three-phase output windings and corresponding terminals/leads, with each output winding exhibiting a unique phase angle, according to one embodiment.
Figure 16A:
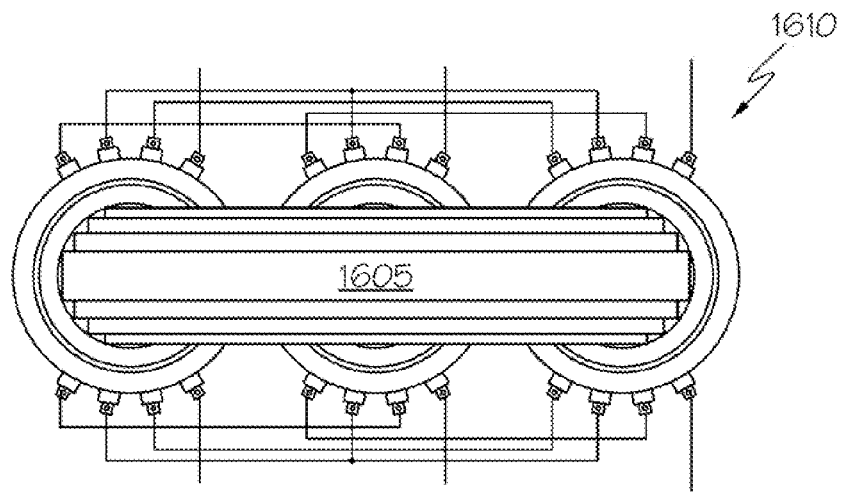
FIGS. 16A-16D provides multiple different views of the placement of the secondary (and primary) windings on/around the magnetic core of an AHQ transformer, which yields similar power output (unique phase angle) characteristics as the AHQ/CPM transformer of FIG. 15 when coupled to an appropriate electrical device, such as a VFD with three converters/inverters, in accordance with one embodiment.
Figure 16B:
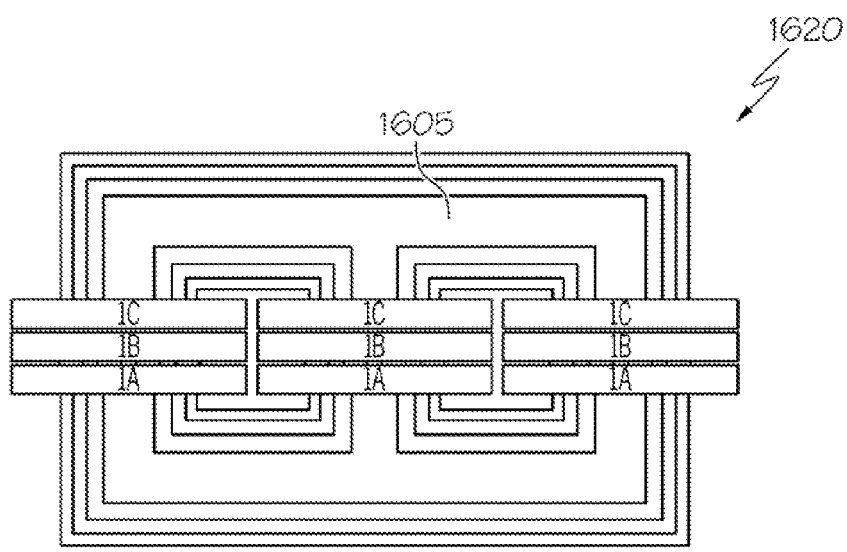
Figure 16D:
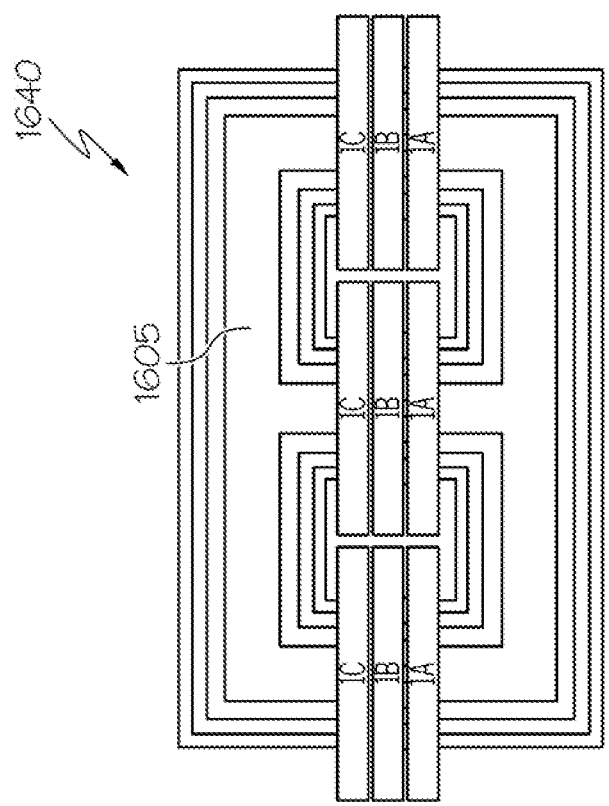
Figure 16C:
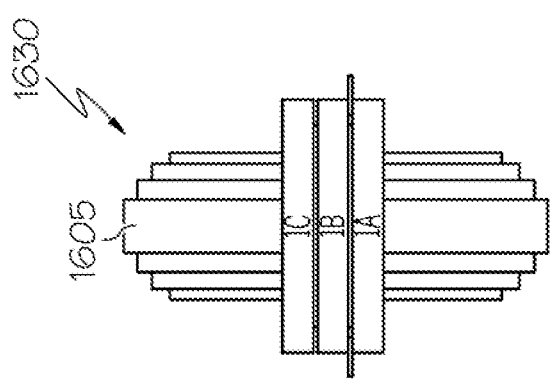
Figure 17:
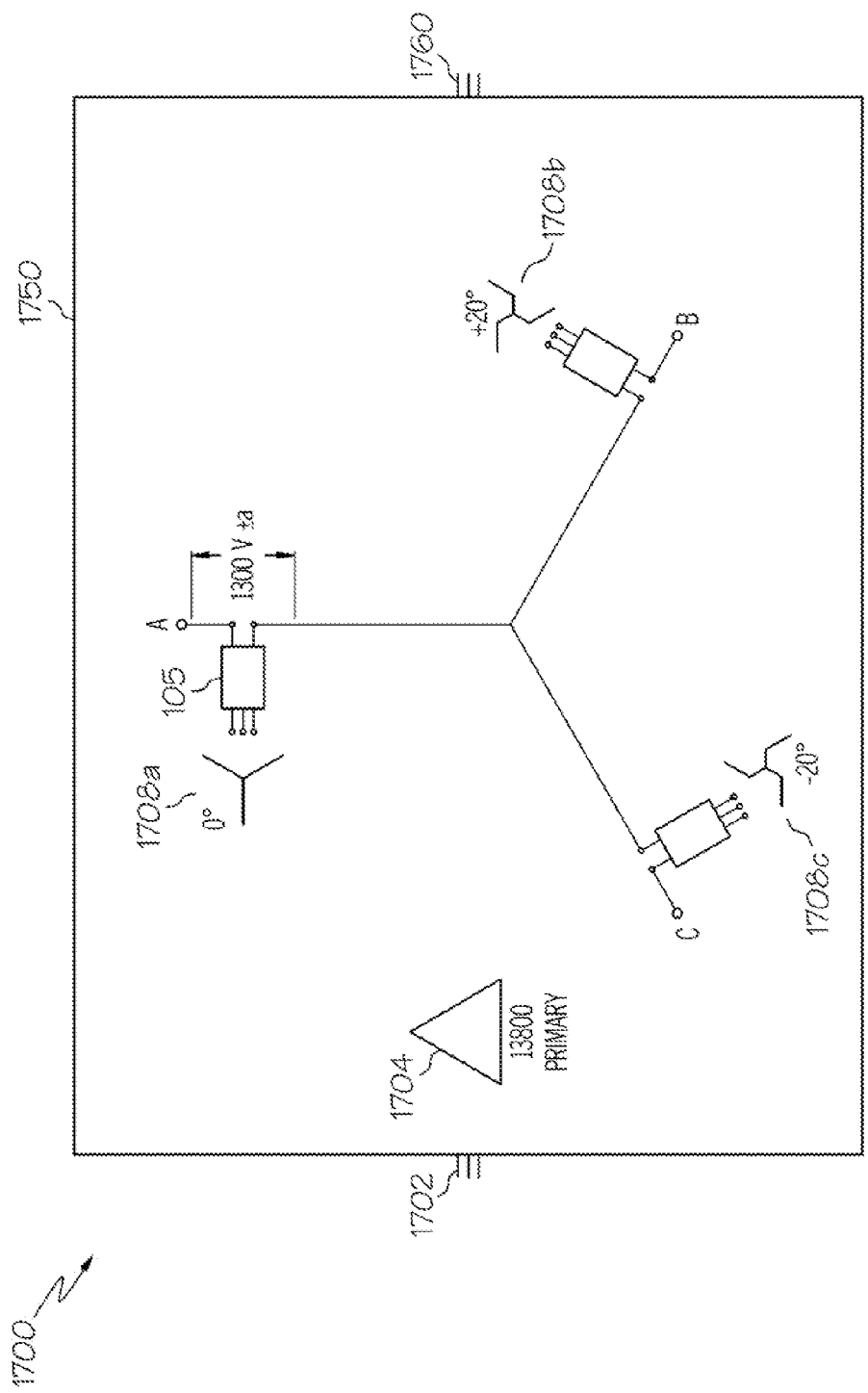
FIG. 17 is a schematic diagram of an example 18 pulse VFD system, illustrating the phase relationships of the primary and secondary windings of an AHQ/CPM transformer which feed the three phase inputs of the three three-phase to single-phase converter/inverter modules of a VFD, according to one embodiment.

FIG. 17 illustrates one embodiment of an 18 pulse VFD system 1700 designed with only one converter/inverter 1705 per leg of the VFD 1710. The converters/inverters 1705 are connected to and powered by respective unique phase angled outputs of secondary windings 1508 of an AHQ/CPM transformer 1500 (FIG. 15). The output voltages across the converters/inverters 1705 are within some voltage deviation from the example desired voltage (1300V), and the variances for each voltage can be different (e.g., plus or minus a, b, . . . ). The relevant winding configuration for providing the unique phase angles are provided by the winding configuration of secondary windings around the magnetic core 1605 as illustrated by the different views (1610, 1620, 1630, 1640) of FIGS. 16A-16D. Examples of the unique phase angles generated are then provided by example AHQ/CPM transformer 1500 of FIG. 15, which depicts the unique phase angles corresponding to each three phase output 1506 generated by the secondary windings 1508.

Figure 18:
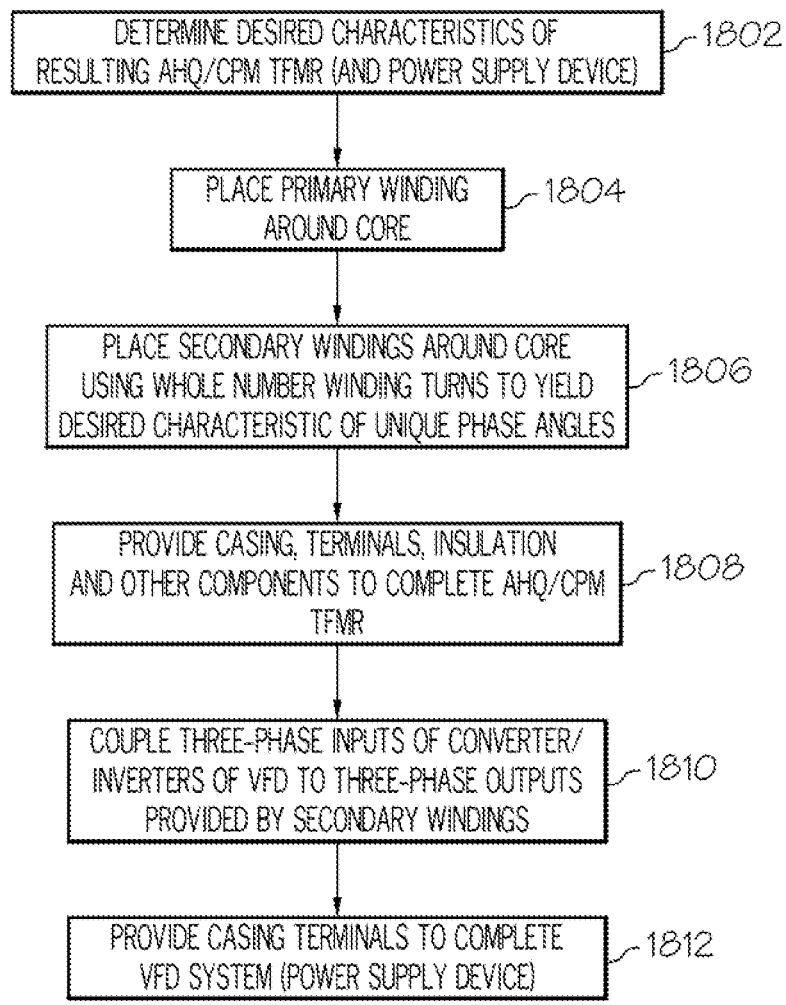
FIG. 18 is a flow chart of the method for engineering, manufacturing, and using an AHQ/CPM transformer, according to one embodiment.

D. Method of Engineering and Manufacturing AHQ/CPM Transformers and VFD Systems with AHQ/CPM Transformers FIG. 18 is a flow chart illustrating a method by which an AHQ/CPM transformer can be engineered and manufactured and used within a VFD system and/or a power input device, according to one or more embodiments. The method begins at block 1802 at which one or more desired characteristics to be exhibited by a resulting transformer, including a voltage output range and a number of secondary windings outputs, is determined. In one embodiment, these characteristics are programmed into a processing device and/or can be received from a design engineer with knowledge of the system in which the transformer is to be utilized. With the relevant characteristics determined and/or the relevant design parameters entered/received, the method proceeds to block 1804 at which a machine places a primary winding around a magnetic core having three limbs. The primary winding is placed in a manner that enables input leads at which a three phase power supply can be connected to extend from the magnetic core. At block 1806, the machine places a plurality of secondary windings around the limbs of the magnetic core in a specific configuration and with a specific number of turns for each secondary windings. The secondary windings are radially spaced from the primary winding, and the secondary windings provide three output winding groups of N secondary windings outputs that extend from the magnetic core. The number of turns provided for each of the secondary windings is determined based on one or more desired characteristics and a configuration that enables each secondary winding output to exhibit a different phase angle from every other secondary winding output of the AHQ/CPM transformer. Also, the winding turns configuration of the AHQ/TPM transformer comprises a whole number of turns for each secondary winding, and each whole number of turns for each secondary winding is selected via engineering design, based on the desired characteristics determined in order to produce a specific unique output phase angle for each secondary winding output. The unique output phase angle is different relative to each other output phase angle and enables a connected device having components coupled to the secondary winding outputs to exhibit substantially reduced harmonic currents and higher than two times (2×) a current pulse relative to a number of the secondary windings outputs.

With the primary and secondary windings of the AHQ transformer wound around the magnetic core, the casing, ground, and/or other external portions of the transformer are provided at block 1808. However, it is appreciated that this step is optional as an internal casing for the transformer may not be utilized in some designs of the power input device/VFD system. In one embodiment, insulation is placed between various ones of the primary and secondary windings and between individual secondary windings and between groups of secondary windings to cause or generate certain desired electrical characteristics or to prevent the occurrence of certain undesirable electrical characteristics in the resulting windings configuration. At block 1810, three phase inputs of an electrical system of electrical components are coupled to the output winding groups. The system comprises three legs of N serially-connected electrical devices each having a three phase input and a single phase output, where the N electrical devices exhibit similar output voltage characteristics. In one embodiment, the electrical system is a VFD and the resulting coupling of the VFD with the AHQ/CPM transformer provides an M-pulse VFD system that exhibits greater than 2× and up to 6× the current pulse of a standard VFD and substantially reduced harmonic currents. Following, at block 1812, an external casing is provided around the VFD system (or power input device), and input terminals/leads for the three phase input of the transformer's primary windings and output terminals of the power input device are provided to enable the attachment of a power supply and a load, respectively.

It is appreciated that aspects of the methods described herein can be implemented via a computer system and/or an automated machine configured to design and/or manufacture portions of the AHQ/CPM transformer, such that the number of turns for the secondary windings wound around each of the limbs of the magnetic core can be determined and/or provided based on receipt of inputs corresponding to the desired characteristics that the resulting transformer should exhibit, including the unique phase angles for each secondary windings output and the voltage deviations permitted from the ideal output voltage. Any type of machine with built in programmable processing logic can be utilized to complete the portions of the design, engineering and/or manufacturing processes. The use of a processor an/or processing logic within the computer system and/or the automated machine to assist in making these and other determinations based on some programmable functionality is covered within the embodiments described herein and within the claims.

While the invention has been particularly shown and described with reference to exemplary embodiments, it will be understood by those skilled in the art that various changes in form and detail may be made and equivalents may be substituted for elements thereof without departing from the spirit and scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims, including all equivalents thereof.

What is claimed is:

1. A power supply device comprising:
   a harmonic current quashing (AHQ) and current pulse multiplier (CPM) three-phase transformer (AHQ/CPM transformer) having: a magnetic core having a three phase configuration; a primary winding placed around the magnetic core and having three primary winding leads to which a three phase power supply can be connected; and a plurality of secondary windings placed around the limbs of the magnetic core in a predetermined winding turns configuration to generate a plurality of three phase outputs, where each three phase output of the plurality of three phase outputs has a different phase angle from all other three phase outputs, with each unique phase angle associated with a three phase output of a corresponding secondary winding being determined based on the winding turns configuration utilized for the corresponding secondary winding; and
   an arrangement of three-phase to single-phase electrical components, with a three phase input of each electrical component coupled to one of the three phase outputs, wherein the arrangement is comprised of three legs of N series-connected electrical devices, where the N electrical devices exhibit similar output voltage characteristics and a terminal endpoint of each of the three legs provides one phase of a final three phase output of the AHQ/CPM transformer.

2. The power supply device of claim 1, wherein the predetermined winding turns configuration comprises a whole number of turns for each secondary winding, with each whole number selected via engineering design to produce a specific output phase angle for each secondary winding output that is unique relative to the other output phase angles and which enables a connected device having components coupled to each of the secondary winding outputs to exhibit reduced harmonic currents and a higher than 2× current pulses relative to a number of the secondary winding outputs.

3. The power supply device of claim 2, wherein, responsive to a three phase power being applied across the primary winding inputs, each secondary winding output provides an output voltage having a voltage variance that is within a pre-designated acceptable range relative to a desired voltage for powering the connected device.

4. The power supply device of claim 1, wherein each secondary winding is arranged in a configuration that yields the different phase angles of the secondary windings outputs.

5. The power supply device of claim 1, further comprising:
   an external casing surrounding the primary winding and plurality of secondary windings wound around the magnetic core; and
   three input terminals at which the three primary winding leads terminate.

6. The power supply device of claim 5, further comprising:
   a plurality of output terminals at which the ends of the secondary windings terminate and at which input leads of the arrangement of electrical components being powered via the three phase outputs of the secondary windings can be connected; and
   wherein the arrangement of electrical components comprises a plurality of three-phase to single-phase converters/inverters arranged in a three legged configuration of N series-connected converters/inverters with each leg connected at a midpoint neutral, wherein a three phase input of each converter/inverter of the plurality of converters/inverters is coupled to one of the three phase outputs and the three legged configuration of N series-connected converters/inverters provides a three phase output comprised of the sum of each single-phase output for each converter/inverter on each leg of the three legged configuration.

7. The power supply device of claim 1, wherein the plurality of three phase outputs are arranged in three sets of N secondary windings outputs, with each output within each of the sets of N secondary windings output exhibiting a different phase angle relative to the other outputs in a same set.

8. The power supply device of claim 7, wherein the magnetic core is a three legged magnetic core and each set of N secondary windings is wound around a respective one of the three legs of the magnetic core.

9. The power supply device of claim 7, wherein N is an integer number that is selected based on a power input configuration of a device that is to be powered by the AHQ/CPM transformer.

10. The power supply device of claim 7, wherein N equals an integer number from among one, two, three, four, five and six.

11. A system comprising:
    an electrical device having three legs connected at an electrical neutral, with each leg extending from the electrical neutral to provide one of three outputs, wherein each leg comprises N serially-connected components that each comprises a three phase input and a single phase output; and
    a harmonic current quashing (AHQ) and current pulse multiplier (CPM) (AHQ/CPM) three-phase transformer comprising: a magnetic core having a three phase configuration; a primary winding placed around the magnetic core and having three primary winding leads to which a three phase power supply can be connected; and a plurality of secondary windings placed around the magnetic core in a predetermined winding turns configuration to generate three sets of N three phase outputs that are respectively coupled to the N serially-connected components of each leg of the electrical device, wherein each three phase output of the plurality of three phase outputs has a different phase angle from all other three phase outputs, with each unique phase angle associated with a three phase output of a corresponding secondary winding being determined based on the winding turns configuration utilized for the corresponding secondary winding.

12. The system of claim 11, wherein the electrical device is a variable frequency drive (VFD), each of the electrical components is a converter/inverter, and the system is a VFD system.

13. The system of claim 12, wherein the converter/inverter provides a single phase output voltage when power is applied across the three phase input from a connected secondary windings output of the AHQ/CPM transformer.

14. The system of claim 12, wherein N is an integer number selected based on a type of electrical device to be powered via the AHQ/CPM transformer.

15. The system claim 12, wherein N equals an integer number from among one, two, three and four, with a corresponding VFD system exhibiting current pulse characteristics of an 18 pulse, a 36 pulse, a 54 pulse and a 72 pulse VFD system.

16. The system of claim 12, wherein the N electrical devices exhibit similar output voltage characteristics based on the input voltage applied.

17. The system of claim 12, wherein a first group of N secondary windings output of the AHQ/CPM transformer are coupled to the three phase inputs of the N serially-connected converters/inverters of a first leg of the VFD, a second group of N secondary windings output of the AHQ/CPM transformer are coupled to the three phase inputs of the N serially-connected converters/inverters of a second leg of the VFD, and a third group of N secondary windings output of the AHQ/CPM transformer are coupled to the three phase inputs of the N serially-connected converters/inverters of a third leg of the VFD.

18. The system of claim 12, wherein the secondary windings outputs with unique phase angles provided for each output powers the serially-connected converters/inverters of the VFD to yield electrical characteristics within the VFD system including: (a) a number of current pulses (current pulse number) that is greater than a total number of the N serially-connected devices (3N) multiplied by two (2); and (b) a substantial reduction in harmonic currents associated with the VFD system based on the increase in current pulse number, such that the power supplying components of the VFD system exhibits and yields minimal harmonic currents.

19. The system of claim 11, wherein the predetermined winding turns configuration of the AHQ/CPM transformer comprises a whole number of turns for each secondary winding, with each whole number selected via engineering design to produce a specific output phase angle for each secondary winding output that is unique relative to the other output phase angles and which enables a connected device having components coupled to each of the secondary winding outputs to exhibit reduced harmonic currents and a higher than two times (2×) current pulses relative to a number of the secondary windings outputs.

20. The system of claim 19, wherein, responsive to a three phase power being applied across the primary winding inputs of the AHQ/CPM transformer, each secondary windings output provides an output voltage having a voltage deviation that is within a pre-designated acceptable range relative to a desired voltage for powering the connected electrical device.

21. The system of claim 11, wherein each secondary winding of the AHQ/CPM transformer is arranged in a configuration that yields the different unique phase angles of the secondary windings outputs.

22. The system of claim 12, further comprising:
an external casing surrounding the AHQ/CPM transformer and connected VFD;
three input terminals at which the three primary winding leads of the AHQ/CPM transformer terminate; and
three VFD output terminals at which the ends of each of the three legs of the VFD terminate and at which an external device requiring three phase input can be connected.

23. The system of claim 1, wherein:
the magnetic core is a three legged magnetic core and each set of N secondary windings is wound around a respective one of the three legs of the magnetic core; and
the plurality of three phase outputs are arranged in three sets of N secondary windings outputs corresponding to a set of N secondary windings wound around each leg of the magnetic core, with each output within each of the sets of N secondary windings output exhibiting a different phase angle relative to the other outputs in a same set.

\* \* \* \* \*